US012792642B2

(12) United States Patent
Lee et al.

(10) Patent No.: US 12,792,642 B2
(45) Date of Patent: Nov. 10, 2026

(54) CONVERSATION-BASED ASSISTANCE USING A DISPLAY FREE BODY WEARABLE COMPUTING DEVICE

(71) Applicant: Dell Products L.P., Round Rock, TX (US)

(72) Inventors: Seungmi Lee, Singapore (SG); Prabu Selvaraj, Singapore (SG); Chin Leong Ong, Singapore (SG); Michiel Sebastiaan Emanuel Petrus Knoppert, Amsterdam (NL); Yan Yan, Singapore (SG); Weiyi Wang, Singapore (SG); Si Fi Faye Li, Singapore (SG)

(73) Assignee: Dell Products L.P., Round Rock, TX (US)

( * ) Notice: Subject to any disclaimer, the term of this patent is extended or adjusted under 35 U.S.C. 154(b) by 134 days.

(21) Appl. No.: 18/788,736

(22) Filed: Jul. 30, 2024

(65) Prior Publication Data

US 2026/0037555 A1 Feb. 5, 2026

(51) Int. Cl.
*G06F 40/30* (2020.01)
*G06F 1/16* (2006.01)
(Continued)

(52) U.S. Cl.
CPC .......... *G06F 16/3329* (2019.01); *G06F 1/163* (2013.01); *G10L 15/1822* (2013.01);
(Continued)

(58) Field of Classification Search
CPC ......... G06F 40/30; G06F 40/35; G10L 15/04; G10L 15/26; G10L 15/30
See application file for complete search history.

(56) References Cited

U.S. PATENT DOCUMENTS

| | | | |
|---|---|---|---|
| 4,907,296 | A | 3/1990 | Blecha |
| 5,856,811 | A | 1/1999 | Shih |

(Continued)

FOREIGN PATENT DOCUMENTS

| | | | |
|---|---|---|---|
| CA | 3223178 | A1 | 12/2022 |
| CN | 109997094 | B | 8/2023 |

(Continued)

OTHER PUBLICATIONS

Schneider et al., "Gaze-aligned head-mounted camera with pan, tilt, and roll motion control for medical documentation and teaching applications", Oct. 2006, 2006 IEEE International Conference on Systems, Man, and Cybernetics, pp. 327-331 (5 pages).

(Continued)

*Primary Examiner* — Daniel Abebe
(74) *Attorney, Agent, or Firm* — WOMBLE BOND DICKINSON (US) LLP

(57) ABSTRACT

Methods and systems for obtaining information using a display free body wearable computing device are disclosed. The method may include obtaining a transcription of at least a portion of a conversation that a user of the display free body wearable computing device may be having. The method may also include analyzing the transcription to determine whether it may be desirable for the display free body wearable computing device to intervene in the conversation with supplementary information. The determination may be made by prompting a large language model to identify, in the transcription, at least topics of the conversation, questions regarding the topics, and levels of disagreement and/or uncertainty regarding potential answers to the questions. If determined to be desirable to intervene, display free body wearable computing device may attempt to intervene in the conversation with the supplementary information.

20 Claims, 11 Drawing Sheets

(51) Int. Cl.

| | |
|---|---|
| ***G06F 16/3329*** | (2025.01) |
| ***G10L 15/18*** | (2013.01) |
| ***G10L 15/26*** | (2006.01) |
| ***G10L 17/02*** | (2013.01) |
| ***G10L 25/78*** | (2013.01) |

(52) U.S. Cl.
CPC .............. *G10L 15/26* (2013.01); *G10L 17/02* (2013.01); *G10L 25/78* (2013.01)

(56) References Cited

U.S. PATENT DOCUMENTS

| | | | | |
|---|---|---|---|---|
| 7,810,750 | B2 | 10/2010 | Abreu | |
| 8,159,519 | B2 | 4/2012 | Kurtz | |
| 8,837,026 | B2 | 9/2014 | Fisker | |
| 8,902,315 | B2 | 12/2014 | Fisher et al. | |
| 9,538,072 | B2 | 1/2017 | Stewart et al. | |
| 9,912,862 | B2 | 3/2018 | Peruch | |
| 10,110,805 | B2 | 10/2018 | Pomerantz | |
| 10,163,210 | B2 | 12/2018 | Kim | |
| 10,389,993 | B2 | 8/2019 | Macmillan et al. | |
| 10,621,973 | B1 | 4/2020 | McVicker | |
| 10,924,651 | B2 | 2/2021 | Chaudhri et al. | |
| 11,196,863 | B2 | 12/2021 | Spohrer | |
| 11,206,325 | B1 | 12/2021 | Dennis | |
| 11,431,038 | B2 | 8/2022 | Jhawar et al. | |
| 11,431,660 | B1 | 8/2022 | Leeds et al. | |
| 11,489,996 | B2 | 11/2022 | Burton | |
| 11,523,055 | B1 | 12/2022 | Chaudhri et al. | |
| 11,523,243 | B2 | 12/2022 | Satongar et al. | |
| 11,567,569 | B2 | 1/2023 | Spencer | |
| 11,709,068 | B2 | 7/2023 | Sommer | |
| 11,790,614 | B2 | 10/2023 | Zohar | |
| 11,816,269 | B1 | 11/2023 | Chaudhri et al. | |
| 11,899,911 | B2 | 2/2024 | Kocienda et al. | |
| 12,026,842 | B1 | 7/2024 | Mayoral | |
| 12,132,983 | B2 | 10/2024 | Shroff | |
| 12,299,830 | B2 | 5/2025 | Zohar | |
| 2004/0189849 | A1 | 9/2004 | Hofer | |
| 2009/0122161 | A1 | 5/2009 | Bolkhovitinov | |
| 2011/0279666 | A1 | 11/2011 | Strombom | |
| 2012/0143605 | A1 | 6/2012 | Thorsen | |
| 2013/0069131 | A1 | 3/2013 | Kerber | |
| 2013/0076913 | A1 | 3/2013 | Xu | |
| 2014/0146153 | A1 | 5/2014 | Birnkrant | |
| 2015/0009550 | A1 | 1/2015 | Misago | |
| 2016/0091975 | A1 | 3/2016 | Kumar | |
| 2016/0225192 | A1 | 8/2016 | Jones | |
| 2017/0007351 | A1 | 1/2017 | Yu | |
| 2017/0099479 | A1 | 4/2017 | Browd | |
| 2017/0181802 | A1 | 6/2017 | Sachs | |
| 2017/0307719 | A1 | 10/2017 | Said | |
| 2017/0322410 | A1 | 11/2017 | Watson | |
| 2018/0012413 | A1 | 1/2018 | Jones | |
| 2018/0325498 | A1 | 11/2018 | Bongiorno et al. | |
| 2019/0019508 | A1 | 1/2019 | Rochford | |
| 2019/0251970 | A1 | 8/2019 | Shukla | |
| 2019/0253700 | A1 | 8/2019 | Tornéus | |
| 2019/0254754 | A1 | 8/2019 | Johnson | |
| 2019/0370532 | A1 | 12/2019 | Soni | |
| 2020/0043479 | A1* | 2/2020 | Mont-Reynaud | G06F 40/58 |
| 2020/0053262 | A1 | 2/2020 | Wexler | |
| 2020/0117025 | A1 | 4/2020 | Sauer | |
| 2020/0159836 | A1* | 5/2020 | Alkan | G06F 16/24522 |
| 2020/0330179 | A1 | 10/2020 | Ton | |
| 2021/0056968 | A1* | 2/2021 | Shreeshreemal | G10L 15/30 |
| 2021/0067764 | A1 | 3/2021 | Shau | |
| 2021/0117680 | A1 | 4/2021 | Chaudhri et al. | |
| 2021/0160441 | A1 | 5/2021 | Bleyer | |
| 2021/0169417 | A1 | 6/2021 | Burton | |
| 2021/0173480 | A1 | 6/2021 | Osterhout et al. | |
| 2021/0174805 | A1* | 6/2021 | Wang | G10L 25/63 |
| 2021/0256046 | A1* | 8/2021 | Newell | G06F 16/3329 |
| 2022/0050580 | A1 | 2/2022 | Takimoto | |
| 2022/0171453 | A1 | 6/2022 | Powederly | |
| 2023/0032467 | A1 | 2/2023 | Shroff | |
| 2023/0071778 | A1 | 3/2023 | Du | |
| 2023/0111489 | A1 | 4/2023 | Zohar | |
| 2023/0280821 | A1 | 9/2023 | Kocienda et al. | |
| 2023/0280866 | A1 | 9/2023 | Kocienda et al. | |
| 2023/0281254 | A1 | 9/2023 | Kocienda et al. | |
| 2023/0281256 | A1 | 9/2023 | Kocienda et al. | |
| 2023/0282214 | A1 | 9/2023 | Kocienda et al. | |
| 2023/0283705 | A1 | 9/2023 | Chaudhri et al. | |
| 2023/0283885 | A1 | 9/2023 | Kocienda et al. | |
| 2023/0283886 | A1 | 9/2023 | Kocienda et al. | |
| 2023/0324993 | A1 | 10/2023 | McDaniel | |
| 2023/0327497 | A1 | 10/2023 | Chaudhri et al. | |
| 2023/0359271 | A1 | 11/2023 | Shin | |
| 2023/0419621 | A1 | 12/2023 | Zohar | |
| 2024/0126363 | A1 | 4/2024 | Kocienda et al. | |
| 2024/0155194 | A1 | 5/2024 | Kocienda et al. | |
| 2024/0221738 | A1 | 7/2024 | Garg | |
| 2024/0242721 | A1 | 7/2024 | Kocienda et al. | |
| 2024/0310990 | A1 | 9/2024 | Beauchamp | |
| 2024/0403772 | A1 | 12/2024 | Lafreniere | |
| 2025/0199621 | A1 | 6/2025 | Moll | |
| 2025/0225995 | A1 | 7/2025 | von Liechtenstein | |
| 2025/0232400 | A1 | 7/2025 | Chen | |
| 2025/0342833 | A1* | 11/2025 | Rothschild | G10L 15/22 |

FOREIGN PATENT DOCUMENTS

| | | | |
|---|---|---|---|
| WO | 202006819 | A1 | 2/2020 |
| WO | 2020068819 | A1 | 4/2020 |
| WO | 2020/257329 | A1 | 12/2020 |
| WO | 2023/168001 | A1 | 9/2023 |
| WO | 2023/168071 | A1 | 9/2023 |
| WO | 2023/168073 | A1 | 9/2023 |
| WO | 2024/118974 | A1 | 6/2024 |

OTHER PUBLICATIONS

Schneider et al., “Movies Made Through the Eyes of a Mobile User With a Gaze-Aligned Camera”, ICME 2006, pp. 2121-2124 (4 pages).

Md Messal Monem Miah et al., “Multimodal Contextual Dialogue Breakdown Detection for Conversational AI Models”, NAACL 2024 Industry Track, arXiv:2404.08156v1, Apr. 11, 2024, <https://arxiv.org/abs/2404.08156v1>, retrieved on Jul. 24, 2024 (12 pages).

Donggang Jia et al., “Voice: Visual Oracle for Interaction, Conversation, and Explanation”, arXiv:2304.04083v2, Jan. 22, 2024, <https://arxiv.org/abs/2304.04083>, pp. 1-21, retrieved on Jul. 24, 2024 (21 pages).

Ambuj Mehrish et al., “A Review of Deep Learning Techniques for Speech Processing”, arXiv:2305.00359v3, May 30, 2023, <https://arxiv.org/pdf/2305.00359>, pp. 1-111, retrieved on Jul. 24, 2024 (111 pages).

Giuseppe Attanasio et al., “Twists, Humps, and Pebbles: Multilingual Speech Recognition Models Exhibit Gender Performance Gaps”, arXiv:2402.17954v2, Jun. 19, 2024, <https://arxiv.org/pdf/2402.17954>, retrieved on Jul. 24, 2024 (23 pages).

Konstantinos Tsiakas et al., “Unpacking Human-AI interactions: From interaction primitives to a design space”, arXiv:2401.05115v1, Jan. 10, 2024, < https://arxiv.org/abs/2401.05115>, pp. 1-46, retrieved on Jul. 24, 2024 (46 pages).

Pabbathi Sri Charan et al., “Effective Gesture Based Framework for Capturing User Input”, arXiv:2208.00913, Aug. 1, 2022, <https://arxiv.org/ftp/arxiv/papers/2208/2208.00913.pdf>, pp. 1-10, retrieved on Jul. 24, 2024 (10 pages).

Chao Chen et al., “Simple calibration method for dual-camera structured light system”, Journal of the European Optical Society-Rapid Publications, 14, Article No. 23 (2018), Oct. 26, 2018, <https://doi.org/10.1186/s41476-018-0091-y>, pp. 1-11 pages, retrieved on Jul. 24, 2024 (11 pages).

David Pierce, “Limitless is a new AI tool for your meetings—and an all-hearing wearable gadget”, The Verge, Apr. 15, 2024, <https://

(56) References Cited

OTHER PUBLICATIONS www.theverge.com/2024/4/15/24130832/limitless-ai-pendant-wearable-meetings> retrieved on Jul. 30, 2024 (8 pages).

* cited by examiner

CONVERSATION-BASED ASSISTANCE USING A DISPLAY FREE BODY WEARABLE COMPUTING DEVICE

FIELD

Embodiments disclosed herein relate generally to information acquisition. More particularly, embodiments disclosed herein relate to obtaining information relevant to a conversation using a display free body wearable computing device.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
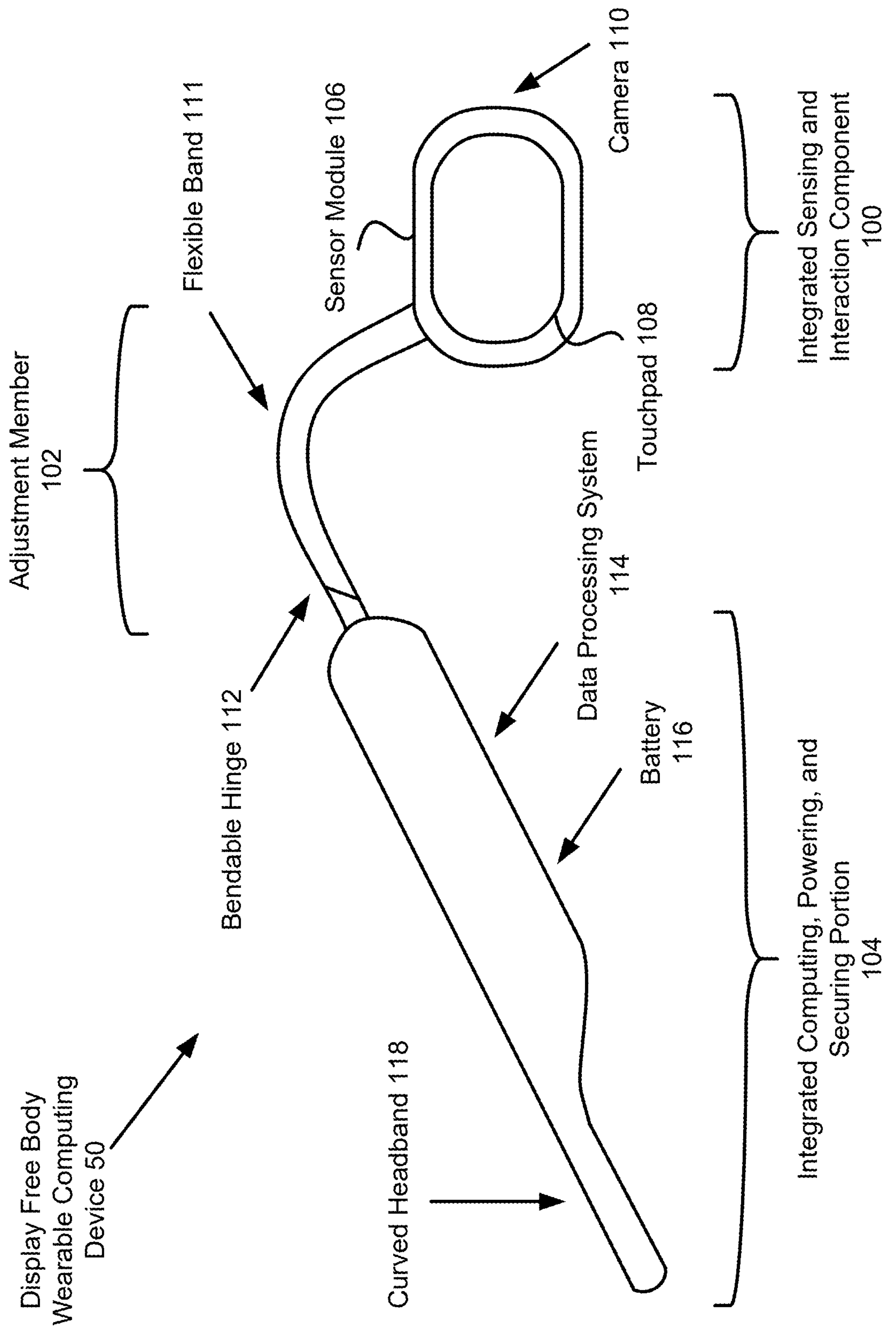
FIG. 1A shows a diagram illustrating a display free body wearable computing device in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for obtaining information using a display free body wearable computing device. The display free body wearable computing device may obtain information relevant to a conversation that a user of the display free body wearable computing device may be having with at least one other person.

The display free body wearable computing device may be configured to be worn on the user's head. When worn by the user, the display free body wearable computing device may provide computer-implemented services by interacting with the user.

The display free body wearable computing device may include sensors (e.g., cameras, a microphone array, etc.) that may obtain data relevant to a conversation that the user may be involved. The data may include, for example, audio data of the conversation, images of other entities involved in the conversation, and/or any other data. The display free body wearable computing device may obtain a transcription of at least a portion of the conversation based on the data.

Using the transcription, the display free body wearable computing device may prompt a large language model to obtain a semantic analysis package (e.g., identified features of the conversation). The semantic analysis package may include, for example, topics of the conversation, questions regarding the topics discussed during the conversation, levels of disagreement regarding potential answers to the questions, and/or any other information.

Based on the semantic analysis package, the display free body wearable computing device may determine whether it may be desirable to intervene in the conversation (e.g., to provide supplementary information regarding topics of the conversation). To determine whether it may be desirable to intervene, the display free body wearable computing device may grade the levels of disagreement regarding aspects of the conversation.

If determined to not be desirable to intervene, the display free body wearable computing device may not prompt the user. However, if determined to be desirable to intervene, the display free body wearable computing device may generate, by prompting a generative model, supplementary information (e.g., potential answers to questions discussed in the conversation) and prompting (e.g., discreetly notifying the user using speakers of the display free body wearable computing device) the user to attempt to intervene in the conversation using the supplementary information.

If the user provides user feedback indicating agreement of the intervening (e.g., by pressing a touchpad of the display free body wearable computing device), the display free body wearable computing device may provide an answer of the supplementary information to the user (e.g., by communicating the supplementary information via speakers of the display free body wearable computing device). If the user provides user input indicating that the answer is unwelcome (e.g., not pressing the touchpad, releasing the pressing of the touchpad before completing the providing of the answer, etc.), the display free body wearable computing device may terminate the providing of the answer.

Additionally, the user input (e.g., time taken to accept answer, percentage of answer provided before terminating the providing of the answer, etc.) may be recorded as user data. The user data may subsequently be used in optimizing inference processes (e.g., obtaining the semantic analysis package using the large language model, making the determination regarding a desirability to intervene in the conversation, etc.).

Thus, embodiments disclosed herein may provide an improved method for obtaining information using a display free body wearable computing device to identify opportunities to intervene in a conversation. By doing so, relevant information may be provided to a user of the display free body wearable computing device.

In an embodiment, a method for obtaining information using a display free body wearable computing device is provided. The method may include: (i) identifying that a user of the display free body wearable computing device is having a conversation; based on the identifying: (a) obtaining, using at least one sensor of the display free body wearable computing device, a transcription of at least a portion of the conversation; (b) obtaining, based on the transcription, a semantic analysis package for the conversation; (c) making, based at least on the semantic analysis package, a determination regarding whether it is desirable for the display free body wearable computing device to intervene in the conversation; (d) in a first instance of the determination where it is desirable: (i) generating, based at least on the semantic analysis package, supplementary information; (ii) prompting the user to attempt to intervene in the conversation using the supplementary information; and (iii) in a first instance of the prompting where the user agrees to allow the attempt to intervene: (a) attempting to provide the user the supplementary information.

Identifying that the user of the display free body wearable computing device is having the conversation may include: (i) obtaining, using at least one audio sensor of the display free body wearable computing device, audio data; and (ii) identifying that the audio data comprises speech between a plurality of speakers, the plurality of speakers comprising the user of the display free body wearable computing device and at least one other person.

Obtaining the transcription may include: (i) transcribing an audio recording of the conversation into a text format; and (ii) annotating the text format with identities of the plurality of the speakers based on a speaker segmentation performed to identify identities of the plurality of speakers as sources of a portion of the audio recording.

Obtaining the semantic analysis package may include: prompting a large language model to identify, in the transcription, at least: (i) topics of the conversation; (ii) questions regarding the topics discussed during the conversation; and (iii) levels of disagreement regarding potentials answers to the questions.

The levels of disagreement regarding potential answers to the questions may include: (i) uncertainty levels in the questions present in the conversation; and (ii) levels of debate in the questions present in the conversation.

Making the determination may include: (i) grading, using a rubric, the levels of disagreement regarding potential answers to the questions corresponding to the topics and the questions to obtain grades for the topics and the questions; (ii) identifying whether at least one of the grades exceeds a grades threshold; and (iii) in a first instance of the identifying where the at least one of the grades exceeds the grades threshold: (a) concluding that it is desirable; and (iv) in a second instance of the identifying where none of at least one of the grades exceeds the grades threshold: (a) concluding that it is not desirable.

Generating, based at least on the semantic analysis package, the supplementary information may include: (i) prompting, using at least one of the questions, a generative model to obtain an answer.

Prompting the user to attempt to intervene in the conversation using the supplementary information may include (i) discreetly notifying the user of availability of the answer and monitoring for user feedback based on the notifying; (ii) in a first instance of the notifying where the user provides user feedback indicating agreement to the intervening: (a) concluding that the user desires the intervening; and (iii) in a second instance of the notifying where the user does not provide user feedback: (a) concluding that the user does not desire the intervening.

Attempting to provide the user the supplementary information may include: (i) initiating discreetly providing of the answer to the user while monitoring for user input during the providing; (ii) in an instance of the initiating where the user provides the user input indicating that the answer is unwelcome: (a) terminating the providing before completing of the providing of the answer to the user.

The display free body wearable computing device may include: (i) an integrated sensing and interaction component adapted to: (a) be positioned symmetrically on two portions of a user's head, (b) be positioned between ears and eyes of the user, and (c) capture a stereo image of at least a portion of a scene present in a field of view of the user; (ii) an integrated computing, powering, and securing portion; and (iii) an adjustment member adapted to position the integrated sensing and interaction component with respect to the integrated computing, powering, and securing portion.

The integrated sensing and interaction component may include: (i) a pair of cameras; (ii) speakers; (iii) a microphone array; and (iv) a touch pad.

The integrated sensing and interaction component may be adapted to: (i) obtain an audio input from the integrated sensing and interaction component; (ii) perform, by the data processing system, a speech recognition action set, based on the audio input, to obtain a speech recognition result; (iii) obtain a portion of data from a remote entity, the data being based at least in part on the speech recognition result; and (iv) use the portion of the data to assist in an interaction that the user is involved in.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1A, various types of computing devices may provide computer implemented services. The various types of computing devices may include, for example, desktop computers, laptop computers, cell phones, and/or other types of computing devices.

Such computing devices may provide any number and types of computer-implemented services (e.g., to a user of the computing device and/or devices operably connected to the computing device). The computer-implemented services may include, for example, data acquisition services, communication services, and/or other types of services that may be relevant to user and/or other devices.

However, the ability to provide such services may be limited based on the information available to the computing devices. For example, a desktop computer may be positioned under a desk, or in other locations. Consequently, the desktop computer may have a very limited capability to gather information regarding the environment in which it resides.

Accordingly, due to the limited information, the types and quality of computer implemented services may be limited. Returning to the desktop computer example, such desktop computers may lack native ability to capture images and/or audio of scenes that are relevant to a user of the desktop computer. Thus, the desktop computer may lack the ability to provide some types of services that are relevant to a user.

In general, embodiments disclosed herein relate to systems, methods, and devices for providing computer implemented services that are of relevance to users. To provide the computer implemented services, a display free body wearable computing device may be utilized. For example, display free body wearable computing device 50 may be adapted to be worn by a user. When worn by a user, the body wearable computing device may be able to gather information that is more relevant to users for use in providing computer-implemented services.

The computer-implemented services may include, for example, providing supplementary information relevant to a conversation that a user using the display free body wearable computing device may be involved in. To identify that the user is involved in a conversation, the display free body wearable computing device may obtain, using at least one audio sensor of the display free body wearable computing device, audio data and identify that the audio data may include speech between a plurality of speakers (e.g., the user and at least one other person).

Once identified, the display free body wearable computing device may obtain a transcription (e.g., a text format of the conversation based on an audio recording of the conversation) of at least a portion of the conversation. The transcription may indicate levels of disagreement (e.g., uncertainty, debate, etc.) regarding potential answers to questions regarding topics discussed in the conversation. Based on the transcription and/or processing of the transcription (e.g., obtaining a semantic analysis package, grading the levels of disagreement, etc.), the display free body wearable computing device may determine whether it may be desirable to intervene the conversation (e.g., to provide supplementary information regarding potential answers to the questions).

If determined that it may be desirable to intervene, the display free body wearable computing device may discreetly notify the user and/or obtain user feedback (e.g., interacting with a touchpad of the display free body wearable computing device) indicating agreement to the intervening. Based on the user feedback, the display free body wearable computing device may provide the supplementary information (e.g., by communicating relevant information via speakers of the display free body wearable computing device) to the user.

Therefore, through use of this more relevant information, the display free body wearable computing device may be more likely to provide computer-implemented services that are of higher relevancy to users.

To provide the computer-implemented services to the user of body wearable computing device 50, display free body wearable computing device 50 may include: (i) integrated sensing and interaction component 100, (ii) adjustment member 102, and (iii) integrated computing, powering, and securing portion 104. Each of these components is discussed below.

Integrated sensing and interaction component 100 may provide input/output services to the user. To do so, integrated sensing and interaction component 100 may host sensors module 106, touchpad 108, camera 110, and/or any other components. To host the components, integrated sensing and interaction component 100 may include a pair of enclosures (e.g., 3-dimensional bubble-shaped housings that may be at least partially transparent) adapted to be positioned symmetrically on both sides of the user's head, between ears and eyes of the user (e.g., proximate to temples of the user). When worn, integrated sensing and interaction component 100 may operate, for example, without covering the user's ear and extending past the user's eyes. By being positioned as such, the body wearable computing device may be worn and used to interact with the user without obstructing facial features (e.g., eyes, ears, etc.) of the user.

Integrated sensing and interaction component 100 may obtain inputs from any number of sensors to identify actions to be performed. For example, integrated sensing and interaction component 100 may obtain guidance image using camera 110 and at least partially process the guidance image to obtain an image processing result. The guidance image may depict a portion of the scene and a portion of the user (e.g., one or more of the user's hands) of display free body wearable computing device 50. Integrated sensing and interaction component 100 may identify a recognizable gesture (e.g., a pointing gesture, framing gesture, etc.) from the guidance image that may trigger an action set for capturing an image. Integrated sensing and interaction component 100 may also obtain and use audio inputs (e.g., voice commands) for use in identifying actions sets for capturing an image, individually and/or cooperatively with visual inputs (e.g., the guidance image).

For example, consider a scenario in which a user raises a hand to point at car while issuing a voice command to take a picture. Integrated sensing and interaction component 100 may identify the user's hand as a pointing gesture and/or identify the voice command issued by the user. Integrated sensing and interaction component 100 and/or any other entities (e.g., data processing system 114, remote entities, etc.) may subsequently identify an action set based on the gesture and/or the voice command. The action set may include, for example, audio instructions using speakers of integrated sensing and interaction component 100 to direct the user to remove the user's hand from a field of view while retaining the car in the field of view, activating image sensors of camera 110 to capture a stereo image, combining the stereo image, and/or any other actions.

Touchpad 108 may be used to receive tactile input. For example, a user may provide input by using one or more fingers to touch, press, any/or perform any other actions using touchpad 108. The input may be used, for example, to trigger actions, provide information to the display free body wearable computing device for use in providing computer-implemented services, and/or any other use cases. To improve ease of use, touchpad 108 may be affixed to a lateral side of integrated sensing and interaction component 100 away from the user's head when worn. Touchpad 108 may be included on either or both enclosures of integrated sensing and interaction component 100.

Sensor module 106 may provide at least a portion of the input/output services provided by integrated sensing and interaction component 100. To do so, sensors module 106 may include any number and/or type of sensors. For example, sensors module 106 may include speakers and a microphone array. The microphone array of sensor module may obtain, for example, audio data that may indicate a conversation between the user of display free body wearable computing device 50 and at least one other person. The audio data may be analyzed by components of sensor module 106, data processing system 114, and/or any other entities to identify opportunities to intervene in the conversation with supplementary information relevant to the conversation (e.g., answers to potential questions discussed in the conversation).

Camera 110 may capture images. The images captured by camera 110 may include stereo images of at least a portion of a scene present in a field of view of the user. The stereo images may include a pair of images of the scene, each of the images being captured at different angle and/or positions (e.g., different viewpoints) with respect to the scene by camera 110. For example, camera 110 may capture images of one or more other people that may be involved in a conversation with the user (e.g., to identify sources of speech in the conversation), objects present in the scene that may be relevant to topics discussed in the conversation, and/or any other information.

To do so, camera 110 may include a pair of cameras that may each be positioned inside an enclosure of the pair of enclosures of integrated sensing and interaction component 100 on both sides of the user's head between eyes and ears of the user. Furthermore, camera 110 may be pointed in a direction generally aligned with a direction that the user's eyes may be pointed. By being positioned as such, camera 110 may be configured to establish a camera line of sight that is parallel to a line of sight of the user, and a camera field of view that include the field of view of the user. Refer to FIGS. 1C-1D for additional details regarding the camera field of view and the camera line of sight relative to the user.

Camera 110 may configure image capturing settings (e.g., focus, zoom, etc.) based on information obtained by integrated sensing and interaction component 100 and/or any other components of display free body wearable computing device 50 (e.g., data processing system 114).

Adjustment member 102 may at least partially secure display free body wearable computing device 50 to the user's head and be adapted to position integrated sensing and interaction component 100 with respect to integrated computing, powering, and securing portion 104. To do so, adjustment member may include flexible band 111 and bendable hinge 112.

Flexible band 111 may be configured in a shape (e.g., a curved shape) that may enable adjustment member 102 to rest on an ear of the user while display free body wearable computing device 50 is used by the user. Furthermore, flexible band 111 (e.g., the shape of flexible band 111) may be modified (e.g., via bending) to improve comfort and/or fit of display free body wearable computing device 50 while used by the user.

Bendable hinge 112 may enable repositioning of integrated sensing and interaction component 100 with respect to integrated computing, powering, and securing portion 104. For example, when bendable hinge 112 is in a first state (e.g., not bent), integrated computing, powering, and securing portion 104 may be configured to be positioned around the back of the user's head while integrated sensing and interaction component 100 is positioned between ears and eyes of the user. Alternatively, when bendable hinge 112 is in a second state (e.g., bent at a certain angle), integrated computing, powering, and securing portion 104 may be configured to be positioned around the top of the user's head while integrated sensing and interaction component 100 is positioned between ears and eyes of the user.

Integrated computing, power, and securing portion 104 may provide at least a portion of the computer-implemented services and may at least partially secure display free body wearable computing device 50 to the user. To do so, integrated computing, powering, and securing portion 104 may include an enclosure that includes: (i) data processing system 114, (ii) battery 116, and (iii) curved headband 118.

Data processing system 114 may provide computer-implemented services based on inputs (e.g., stereo images, audio inputs, etc.) obtained from integrated sensing and interaction component 100. To do so, data processing system 114 may host any quantity of hardware resources that may include, for example, a processor operably coupled to memory, storage, and/or other hardware components (e.g., sensors of integrated sensing and interaction component 100). Data processing system 114 may facilitate performance of actions requested by a user of display free body wearable computing device 50 (e.g., independently and/or cooperatively with remote entities that may provide a second portion of computer-implemented services).

Using the hosted hardware resources and/or applications supported by the hardware resources, data processing system 114 may provide services relevant to images, audio, text, decision making, and/or any other capabilities. For example, data processing system 114 may perform operations relevant to the service and/or data processing system 114 may communicate with remote entities using a network stack hosted by hardware resources of data processing system 114.

To provide services relevant to images (e.g., pictures, video, etc.), data processing system 114 may obtain image data from one or more cameras of camera 110. The image data may be used to identify user inputs (e.g., hand gestures) that may indicate requests for actions to be performed by the body wearable computing device. Data processing system 114 may subsequently make decisions to handle the requests based on the user input. Additionally, data processing system 114 may perform image stitching using a stereo image of the image data to obtain a unified image of a portion of a scene present in a field of view of the user. Data processing system 114 may process and/or perform actions based on derived information from the unified image.

To handle the requests based on the user inputs for decision making, data processing system 114 may utilize hardware and/or software adapted to process the user inputs. For example, data processing system 114 may use a tactile input handling application to make decisions (e.g., perform an action set, communicate information, etc.) based on tactile input received from touchpad 108.

Additionally, data processing system 114 may perform services based on audio input received from a microphone array of sensor module 106 that may include, for example, transcription, speaker segmentation, and/or any other service. To do so, data processing system 114 may, for example, host applications adapted to interpret conversations, recognize speech, convert speech to text, and/or perform any other operations. Data processing system 114 may similarly make decisions based on information obtained from the audio input.

To communicate results of the services to the user of the body wearable computing device, data processing system 114 may send information to be output from speakers of sensor module 106. To do so, data processing system 114 may utilize hardware and/or software to transmit the information to the speakers. For example, an application may convert text results obtained from the audio and/or image services, as discussed above, to an audio output format that may be communicated to the user.

Consider a scenario in which the unified image includes the user's hands and a sign with words written in a certain language. Data processing system 114 and/or integrated sensing and interaction component 100 may recognize hand gestures performed by the user's hands that may indicate a request for display free body wearable computing device 50 to translate and/or dictate a phrase written on the sign. Data processing system 114 may subsequently communicate the image and/or information from the image to any number and/or type of remote entities (e.g., cloud services, remote artificial intelligence platforms, etc.) that may provide additional services that may provide requested information/results to data processing system 114. Data processing system 114 may then provide instructions to integrated sensing and interaction component 100 to dictate (e.g., using speakers) the requested information.

Battery 116 may supply electrical power to data processing system 114, components of integrated sensing and interaction component 100, and/or any other entities. To do so, battery 116 may obtain and/or store electrical power provisioned by an external power source. The electrical power may subsequently be provided to components of display free body wearable computing device 50 that may request the electrical power for operation.

Curved headband 118 may connect two portions of the body wearable computing device. For example, curved headband may be configured in a curved shape and be adapted to connect a first side of display free body wearable computing device 50 (e.g., including a first portion of integrated sensing and interaction component 100, adjustment member 102, etc.) that may be positioned on the first side of the user's head to a second side of display free body wearable computing device 50 that may be positioned on the second side of the user's head.

While illustrated in FIG. 1A with a limited number of specific components, a system may include additional, fewer, and/or different components without departing from embodiments disclosed herein.

Thus, as shown in FIG. 1A, display free body wearable computing device 50 may provide computer-implemented services to a user using components adapted to capture images of a portion of a scene desired by the user.

Figure 1B:
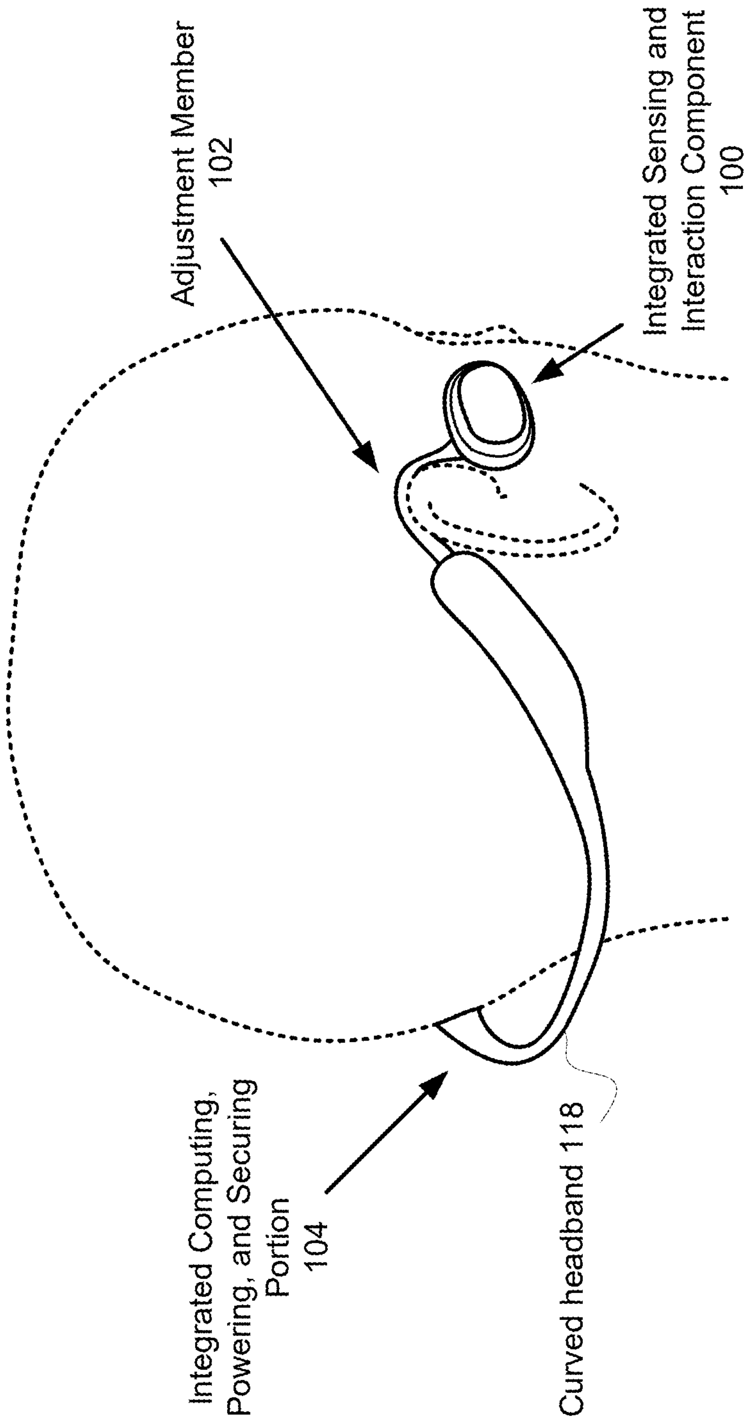
FIGS. 1B-1D show diagrams illustrating alternative views of the display free body wearable computing device in accordance with an embodiment.
Figure 1C:
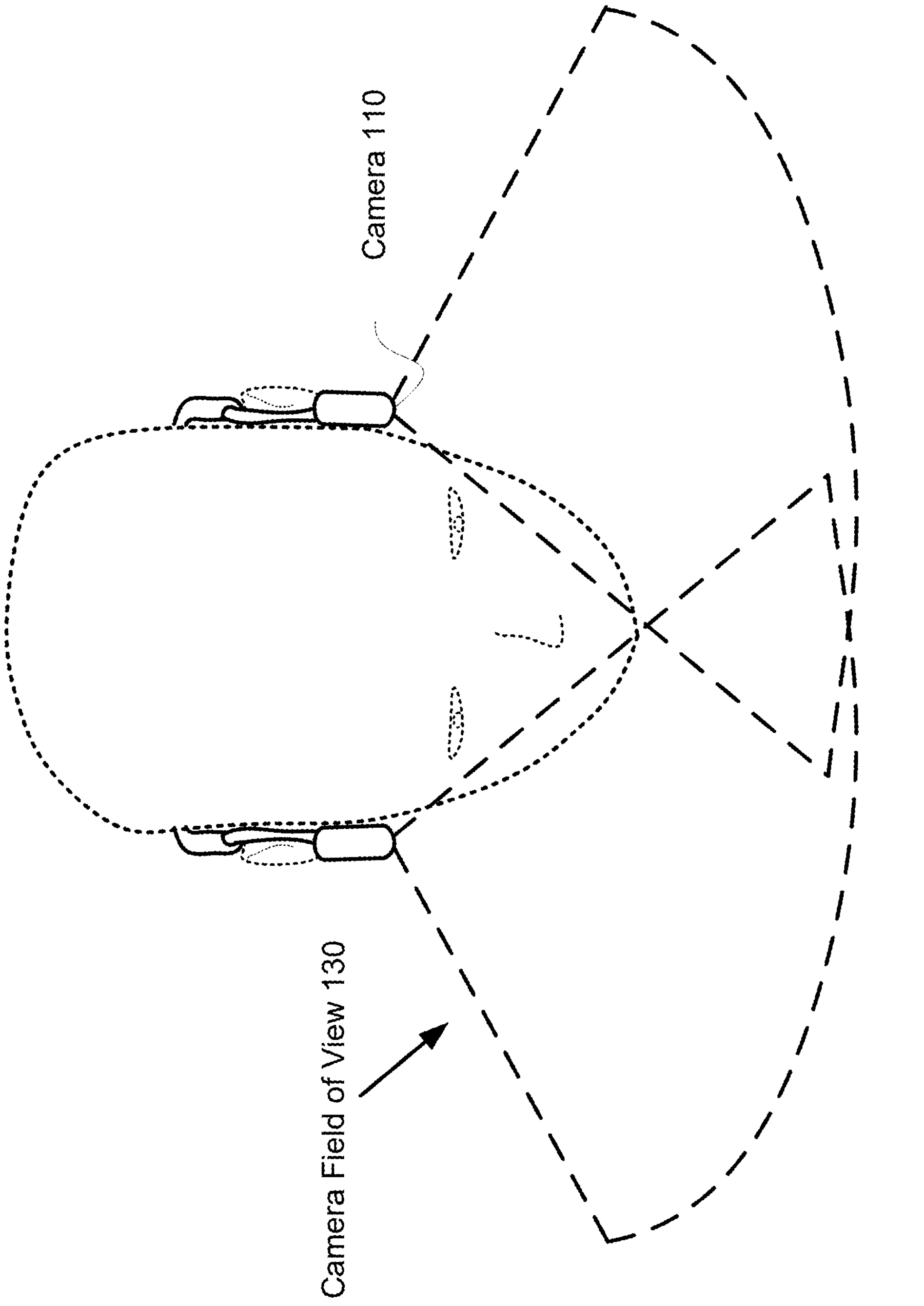
Figure 1D:
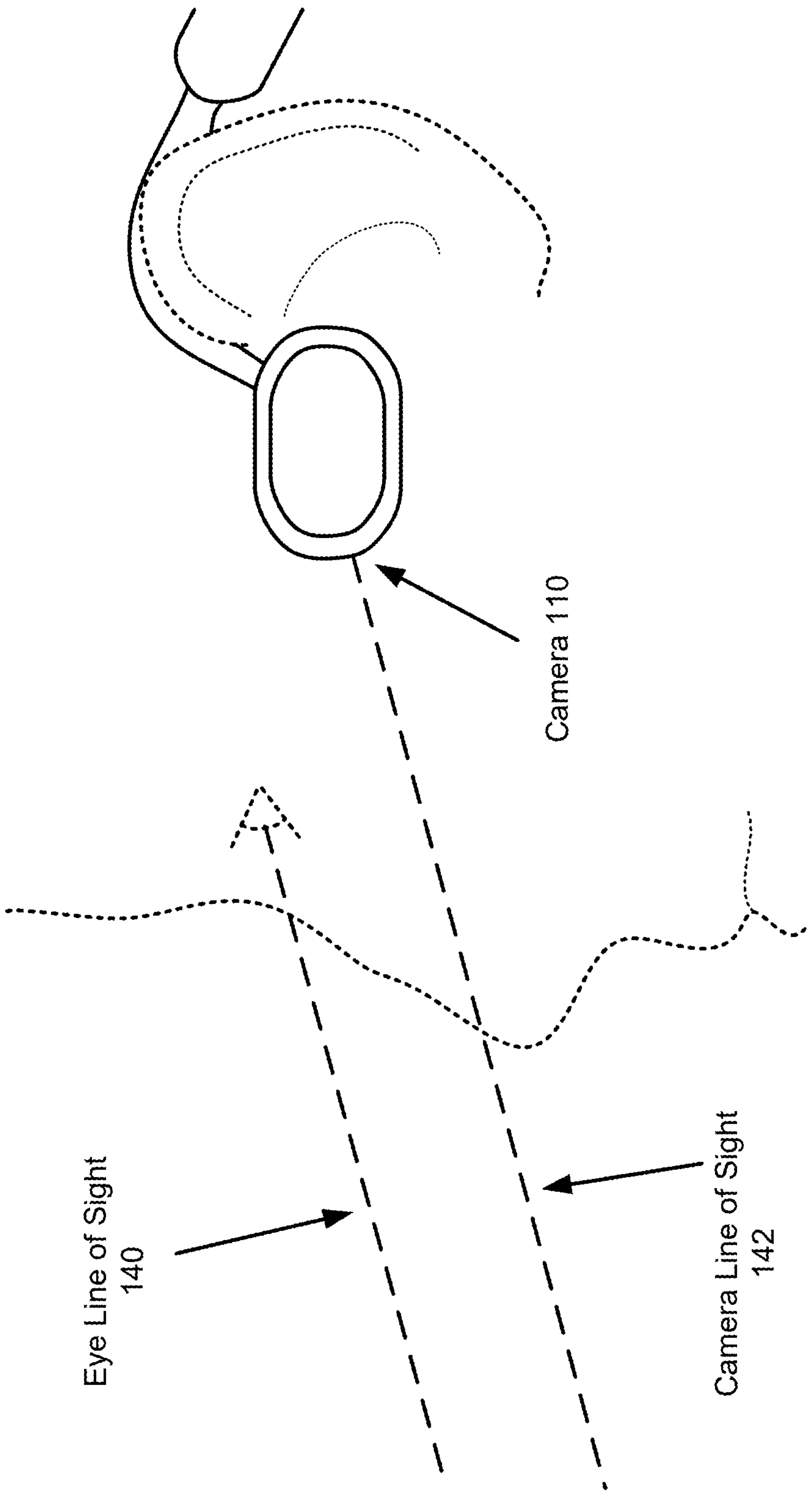

Turning to FIG. 1B, an alternate view of display free body wearable computing device 50 in accordance with an embodiment is shown.

In FIG. 1B, display free body wearable computing device 50 may be illustrated while worn by a user (drawn in short-dashed outline). As shown in FIG. 1B, a portion of integrated sensing and interaction component 100 of display free body wearable computing device 50 is positioned on a first side of the user's head between an eye and an ear of the user while a portion of adjustment member 102 rests on the ear of the user. While not shown, it may be appreciated that a second portion of integrated sensing and interaction component 100 and a second portion of adjustment member 102 may be similarly positioned on a second side of the user's head.

Integrated computing, powering, and securing portion 104 and curved headband 118 of integrated computing, powering, and securing portion 104 may connect the first portions and second portions of adjustment member 102 and integrated sensing and interaction component 100. To do so, curved headband 118 may wrap around the back of the user's head, as shown, while adjustment member 102 is in a first configuration (e.g., not bent). While not shown, it may be appreciated that curved headband 118 and integrated computing, powering, and securing portion 104 may be positioned around the top of the user's head and/or any other position when adjustment member 102 is in a second configuration.

Turning to FIG. 1C, a second alternate view of display free body wearable computing device 50 in accordance with an embodiment is shown. The second alternate view of display free body wearable computing device 50 may include a top-down view of display free body wearable computing device 50 while worn by a user (drawn in short-dashed outline) and may illustrate a camera field of view established by camera 110 (drawn in long-dashed outline).

Camera 110 of integrated sensing and interaction component 100 may, as discussed above, include a pair of cameras positioned on both sides of the user's head between eyes and ears of the user and may be pointed in a direction generally aligned with a direction that the user is facing. Each camera of the pair of cameras may include lens and a sensor that may be configured to establish a portion of camera field of view 130. Camera field of view 130 may include an angular measurement that may indicate a viewable area that may be captured by the camera.

Camera field of view 130 may be established based on the lens (e.g., a focal length of the lens) and/or the sensor (e.g., a size of the sensor) of camera 110. Each camera of the pair of cameras of camera 110 may establish a portion of camera field of view 130 that may each capture a portion of a scene at different angles and/or positions with respect to the scene by the pair of cameras.

For example, consider a scenario in which camera field of view 130 is configured by camera 110 to be 120 degrees of horizontal view. Each camera of the pair of cameras of display free body wearable computing device 50 may capture an image based on the 120 degrees of the scene present in a field of view of the user. When aggregated (e.g., used together), a field of view of the images exceed a field of field of the user. The field of view of the user may include, for example, 120 degrees of viewable area based on binocular vision (e.g., a single image perceived from a pair of images view by a pair of eyes) of the user. The pair of cameras of camera 110 may similarly capture a stereo image that may include a pair of images of the portion of the scene present in the field of view of the user at the different angles and/or positions.

The stereo image may be processed (e.g., via image stitching, aggregation, etc.) by integrated sensing and interaction component 100, data processing system 114, and/or any other entities to generate a resulting image that may include at least the portion of the scene present in the field of view of the user (e.g., a greater field of view when compared to the user's field of view based on the user's binocular vision). The resulting image may subsequently provide information (e.g., additional information that the user may not obtain based on a field of view of the user's eyes) relevant to providing computer-implemented services to the user.

Thus, as shown in FIG. 1C, camera 110 of display free body wearable computing device 50 may be adapted to capture images of at least a portion of the scene present in a user's field of view. The images may provide visual information usable to perform desired actions by display free body wearable computing device 50 for the user.

Turning to FIG. 1D, a third alternate view of display free body wearable computing device 50 in accordance with an embodiment is shown. The third alternate view of display free body wearable computing device 50 may include a side view of display free body wearable computing device 50 while worn by a user and may illustrate a camera line of sight established by camera 110.

Camera 110 may, as discussed above, include a pair of cameras positioned on both sides of the user's head between eyes and ears of the user and may be pointed in a direction generally aligned with a direction that the user is facing. Each camera of the pair of cameras may include lens and a sensor that may be configured to establish camera line of sight 142 that may be parallel to eye line of sight 140 of the user.

Camera line of sight 142 may enable camera 110 to capture images based on a vertical field of view that may be generally aligned with a vertical field of view of the user's eyes. The vertical field of view may be established, for example, by configuring cameras 110 (e.g., in a portrait orientation) to capture a vertical field of view that may include a vertical field of view of the user's eyes. By doing so, camera 110 may capture images of arm/hand movements and/or gestures when performed by the user.

Thus, as shown in FIG. 1D, cameras of display free body wearable computing device 50 may be adapted to capture images that may enable a user to interact with display free body wearable computing device 50 based on the user's line of sight.

Figure 2:
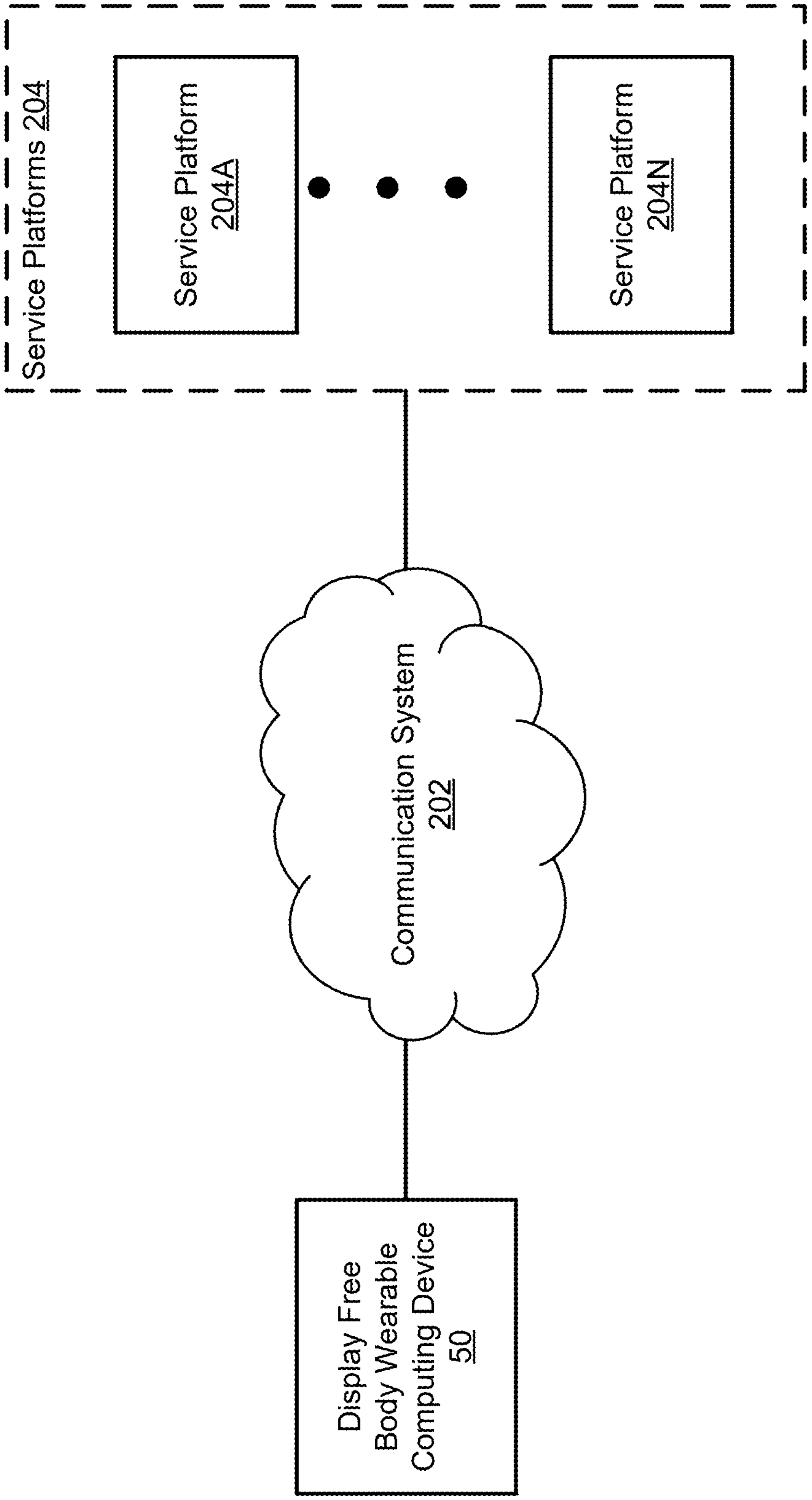
FIG. 2 shows a diagram illustrating a system in accordance with an embodiment.

Turning to FIG. 2, a block diagram in accordance with an embodiment is shown. The block diagram may illustrate a system used in providing computing-implemented services by the display free body wearable computing device.

Display free body wearable computing device 50 may, as previously discussed, provide computer-implemented services to a user. While providing the computer-implemented services, display free body wearable computing device 50 may interact with service platforms 204 to obtain information relevant to the computer-implemented services provided to the user.

Service platforms 204 may, as discussed above, provide remote computing services. Service platforms 204 may include any number and/or type of service platforms that may individually and/or cooperatively perform services requested by display free body wearable computing device 50. Service platforms 204 may include, for example, cloud services (e.g., image storage, speech-to-text, large language model, etc.), artificial intelligence platforms (e.g., generative artificial intelligence), and/or any other remote service platforms. Service platforms 204 may provide information based at least in part on input obtained from display free body wearable computing device 50.

For example, consider a scenario in which a user, while wearing display free body wearable computing device 50, may be looking at a bird perched on a tree in a forest. Display free body wearable computing device 50 may obtain a request (e.g., via a voice command captured by a microphone array of display free body wearable computing device 50, a gesture captured by cameras of from display free body wearable computing device 50, etc.) from the user indicating a desire for a picture of the bird. Display free body wearable computing device 50 may: (i) obtain data that may include an image of the scene, (ii) pre-process the data (e.g., focus the image on the bird, stitch images from a plurality of images captured by cameras of display free body wearable computing device 50, etc.) to obtain a unified image, (iii) communicate the unified image to a service platform (e.g., 204A) of service platforms 204, and/or perform any other actions. Service platform 204A may perform, for example, object recognition services, information search services, and/or any other services to capture the desired image based on the unified image provided by display free body wearable computing device 50. Service platform 204A and/or a second service platform (e.g., service platform 204B) may store the desired image in an image storage service for subsequent retrieval by a user of display free body wearable computing device 50.

Consider a second scenario in which a user of display free body wearable computing device 50 desires to generate a three-dimensional (3D) interactive model of a room that the user is present. Once a request for the 3D interactive model is identified, body wearable computing device 50 may: (i) provide instruction to the user (e.g., to move around the room), (ii) capture images using the camera at a certain frequency (e.g., while the user is moving around the room), and/or perform any other actions. Display free body wearable computing device 50 may provide the captured images along with metadata regarding each of the captured images to a second service platform (e.g., 204B) of service platforms 204. Using image data provided by display free body wearable computing device 50, service platform 204B may perform, for example, 3D rendering services, video editing services, video storage services, and/or any other services to generate the video desired by the user. Display free body wearable computing device 50 may subsequently communicate a status (e.g., completion, instructions for access, etc.) of the desired 3D interactive model to the user.

Communication system 202 may allow any of body wearable computing device 50 and service platforms 204 to communicate with one another (and/or with other devices not illustrated in FIG. 2). To provide its functionality, communication system 202 may be implemented with one or more wired and/or wireless networks. Any of these networks may be a private network (e.g., the "Network" shown in FIG. 6, a public network, a virtual network (e.g., a virtual private network), and/or may include the Internet. For example, body wearable computing device 50 may be operably connected to service platforms 204 via the Internet, a private network, etc. Body wearable computing device 50 and service platforms 204 may be adapted to perform one or more protocols for communicating via communication system 202.

Figure 3A:
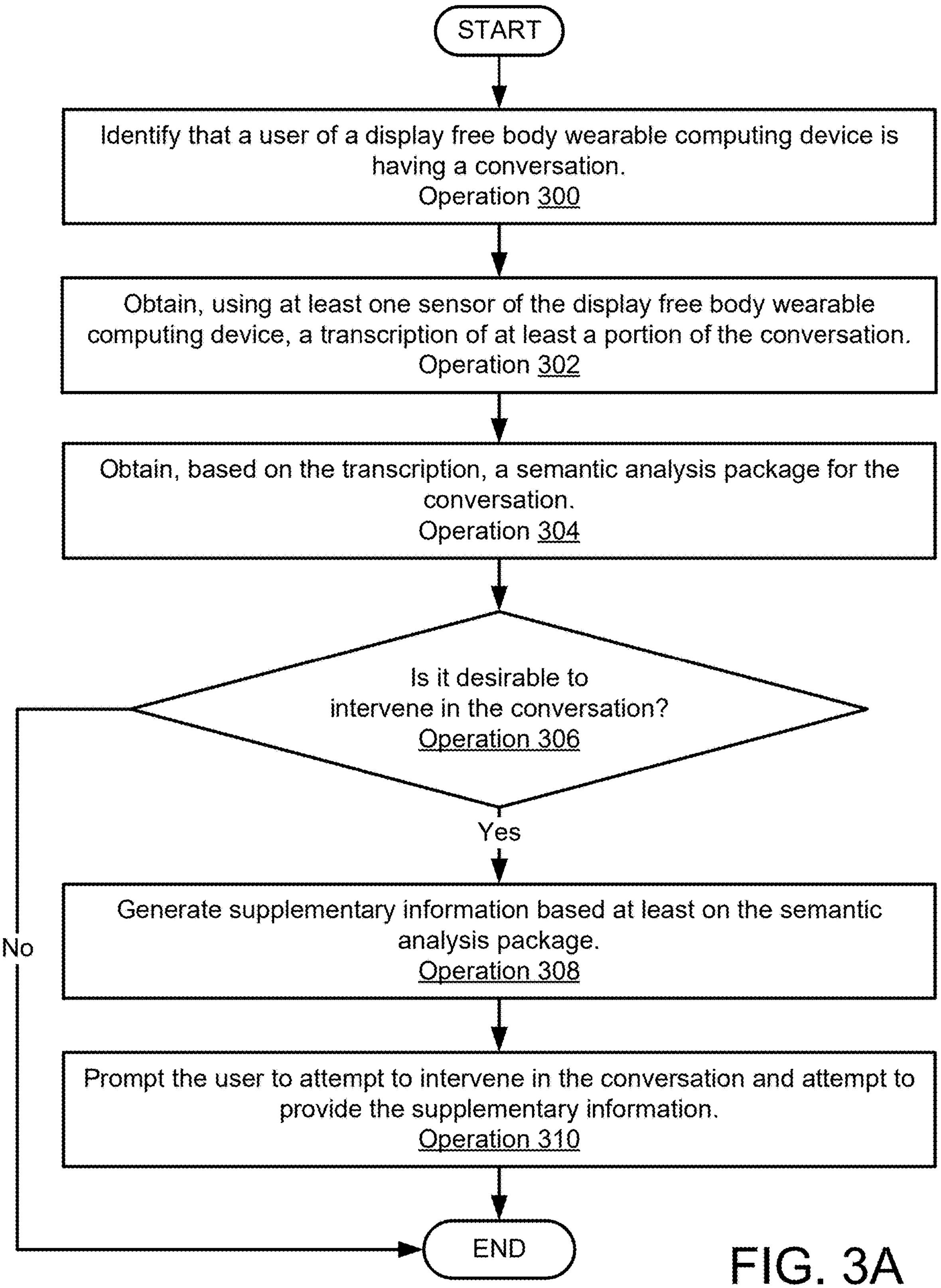
FIGS. 3A-3B show flow diagrams illustrating methods in accordance with an embodiment.
Figure 3B:
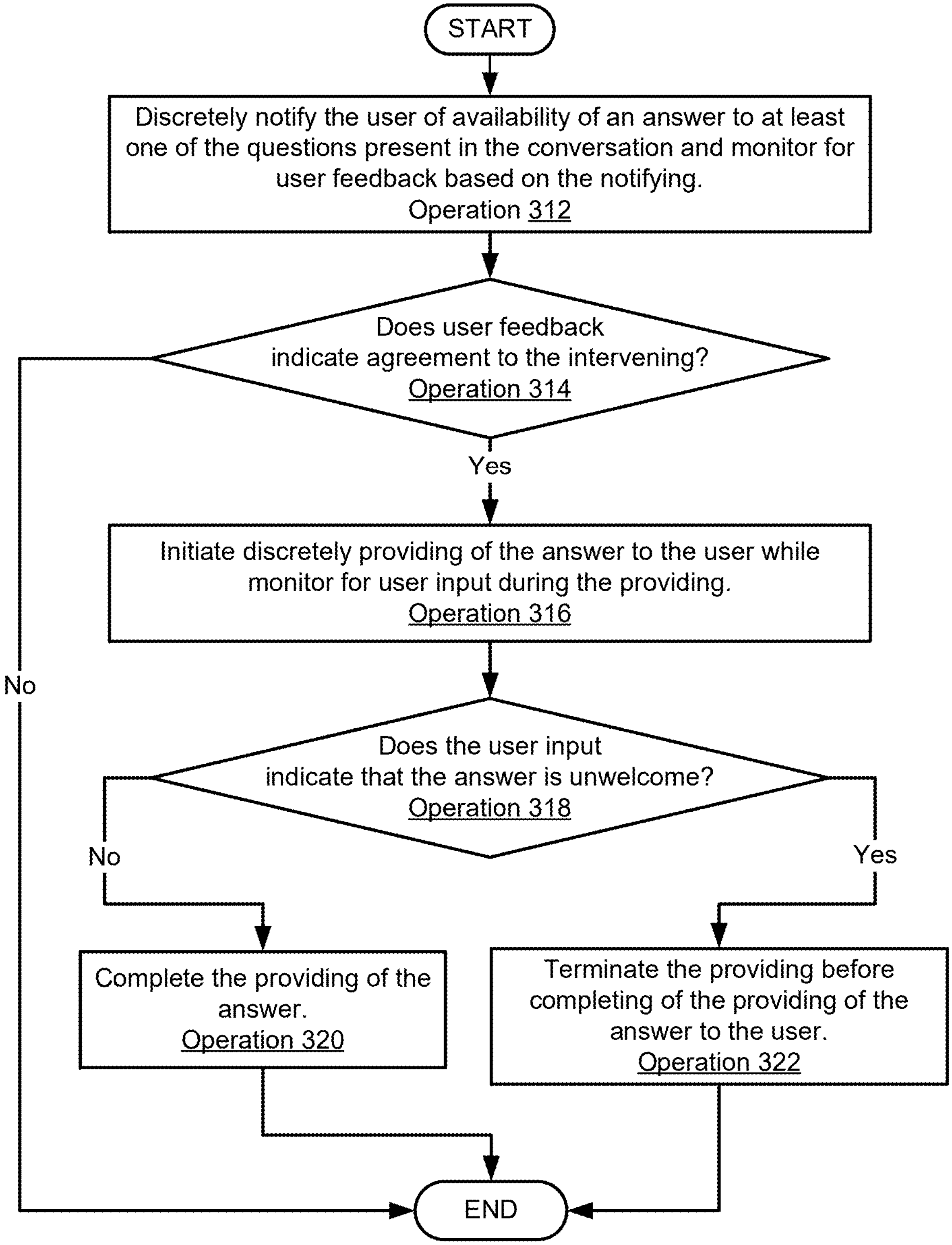

As discussed above, the components of FIG. 1A may perform various methods to capture images of a scene using a display free body wearable computing device. FIGS. 3A-3B illustrate methods that may be performed by the components of the system of FIG. 1A. In the diagrams discussed below and shown in FIGS. 3A-3B, any of the operations may be repeated, performed in different orders, and/or performed in parallel with or in a partially overlapping in time manner with other operations.

Turning to FIG. 3A, a first flow diagram illustrating a method of obtaining information relevant to a conversation using the display free body wearable computing device in accordance with an embodiment is shown. The method may be performed, for example, by any of the components of the systems of FIG. 1A-2, and/or other components not shown therein.

At operation 300, it may be identified that a user of display free body wearable computing device 50 is having a conversation. It may be identified that a user of display free body wearable computing device 50 is having a conversation by: (i) recording audio data of audio signals present in an environment that the user is present, (ii) processing the audio data to identify speech, (iii) identifying that the speech is between a plurality of speakers (e.g., the user and at least one other person), (iv) capturing images of the at least one other person, and/or performing any other actions.

At operation 302, a transcription of at least a portion of the conversation may be obtained using at least one sensor of display free body wearable computing device 50. The transcription may be obtained by: (i) converting an audio recording of the portion of the conversation to a text format, (ii) processing sound signals to identify features of speech (e.g., phonemes, words, etc.), (iii) performing speech-to-text using any type of speech software, (iv) annotating a text format of the conversation with identities of speakers in the conversation, and/or any other process.

At operation 304, a semantic analysis package for the conversation may be obtained based on the transcription. The semantic analysis package may be obtained by: (i) prompting a large language model (e.g., a generative model) to identify features of the conversation, (ii) analyzing the transcription using any number and/or types of inference models and/or software, (iii) extracting enhanced information regarding the conversation (e.g., via natural language processing, quantifying aspects of the conversation, etc.), and/or any other processes. The semantic analysis package may include, for example, topics of the conversation, questions regarding topics discussed during the conversation, levels of disagreement regarding potential answers to the questions, and/or any other information.

At operation 306, a determination may be made regarding whether it is desirable for display free body wearable computing device 50 to intervene in the conversation. The determination may be made by: (i) obtaining a rubric that may be used to grade levels of levels of disagreement identified in the conversation based on the semantic analysis package, (ii) grading the levels of disagreement regarding potential answers to questions corresponding to topics and the questions to obtain grades for the topics and the questions, (iii) comparing the each of the grades and/or an aggregation of the grades to a grades threshold, and/or performing any other actions. If it is determined to be desirable for display free body wearable computing device 50 to intervene in the conversation (e.g., the determination is "Yes" at operation 306), the method may proceed to operation 308. If it is determined to not be desirable for display free body wearable computing device 50 to intervene in the conversation (e.g., the determination is "No" at operation 306), the method may end following operation 306.

At operation 308, supplementary information may be generated based at least on the semantic analysis package. The supplementary information may be generated by: (i) identifying levels of debate and/or uncertainty regarding potential answer to questions present in the conversation, (ii) prompting a generative model (e.g., an generative artificial intelligence model) using at least one of the questions to obtain an answer, (iii) providing questions of the semantic analysis package to any number and/or types of remote entities to obtain results, (iv) selecting a portion of results based on qualities of the results, and/or any other processes.

At operation 310, the user may be prompted by display free body wearable computing device 50 to attempt to intervene in the conversation and attempt to provide the supplementary information. The user may be prompted by: (i) discreetly notifying the user (e.g., via a sound, vibration provided by display free body wearable computing device 50) of availability of an answer to a question identified in the conversation, (ii) monitoring for user feedback based on the notifying, (iii) collecting data relevant to the user feedback (e.g., presence of user feedback, time elapsed between notifying and obtaining user feedback, etc.), and/or performing any other actions. Refer to FIG. 3B for additional details regarding attempting to provide the user the supplementary information.

The method may end following operation 310.

Using the method shown in FIG. 3A, information relevant to a conversation in which a user may be involved may be obtained display free body wearable computing device 50 while worn by the user. By doing so, computer-implemented services provided based on the information may have a higher relevancy to the user of display free body wearable computing device 50.

an image of a portion of a scene may be captured by a display free body wearable computing device based on at least one portion of user input from a user of the display free body wearable computing device. By doing so, a quality of computer-implemented services provided by the display free body wearable computing device using the captured image may be improved.

Turning to FIG. 3B, a second flow diagram illustrating a method of attempting intervene in a conversation using supplementary information in accordance with an embodiment is shown. The method may be performed, for example, by any of the components of the systems of FIG. 1A-2, and/or other components not shown therein.

At operation 312, the user may be discreetly notified of availability of an answer to at least one of the questions present in the conversation and user feedback may be monitored based on the notifying. The user may be discreetly notified and user feedback may be monitored by: (i) transmitting a sound (e.g., a chime via speakers of integrated sensing and interaction component 100), (ii) transmitting a vibration adapted to be felt by the user (e.g., using a transducer of integrated sensing and interaction component 100), (iii) polling input sensors (e.g., a touchpad of integrated sensing and interaction component 100) for user input, and/or any other processes.

At operation 314, a determination may be made regarding whether user feedback indicates agreement to the intervening. The determination may be made by: (i) receiving user input (e.g., pressing on the touchpad) that may indicate that the user desires intervening with supplementary information, (ii) receiving second user input (e.g., a swipe on the touchpad) that may indicate dismissal of the notification, (iii) allowing a time to elapse without receiving any user input that may indicate that the user does not desire the intervening, and/or any other processes. If the user feedback indicates agreement to the intervening (e.g., the determination is "Yes" at operation 314), the method may proceed to operation 316. If the user feedback does not indicate agreement to the intervening (e.g., the determination is "No" at operation 314), the method may end following operation 314.

At operation 316, providing of the answer may be discreetly initiated to the user while monitoring for user input during the providing. The providing of the answer may be discreetly initiated and user input may be monitored by: (i) converting the answer to a speech format, (ii) verbally communicating (e.g., using speakers of integrated sensing and interaction component 100) the answer so that the user may hear the answer, (iii) identifying when a user has modified the user input (e.g., released contact from the touchpad), and/or any other processes.

At operation 318, a determination may be made regarding whether the user input indicates that the answer is unwelcome. The determination may be made by (i) monitoring for changes in user input at any sensors of integrated sensing and interaction component 100, (ii) identifying that the user has released contact with touchpad 108 while providing of the answer, and/or any other processes. If the user input indicates that the answer is unwelcome (e.g., the determination is "Yes" at operation 318), the method may proceed to operation 322. If the user input indicates that the answer is welcome (e.g., the determination is "No" at operation 318), the method may proceed to operation 320.

At operation 320, the providing of the answer may be completed by display free body wearable computing device 50. The providing of the answer may be completed by: (i) communicating an entirety of the answer using speakers of display free body wearable computing device 50, (ii) providing a notification (e.g., a chime, vibration, etc.) that indicates that the providing of the answer is complete, (iii) recording, in a user data repository, information related to the completing of the providing of the answer, and/or performing any other actions.

The method may end following operation 320.

Returning to operation 318, the method may proceed to operation 322 following operation 318 if the user input indicates that the answer is unwelcome.

At operation 322, the providing of the answer may be terminated before completing of the providing of the answer to the user. The providing of the answer may be terminated by: (i) invoking a termination command to at least the speakers of display free body wearable computing device 50, (ii) canceling a communication process for communication the answer, (iii) recording, in a user data repository, information related to the terminating of the providing of the answer (e.g., percentage of answer provided), and/or any other processes.

The method may end following operation 322.

Using the method shown in FIG. 3B, a display free body wearable computing device may attempt to intervene in a conversation with supplementary information relevant to the conversation by prompting the user and monitoring for user feedback. By doing so, a quality of computer-implemented services provided to the user using the information may be improved.

Thus, using the method illustrated in FIGS. 3A-3B, a data processing system in accordance with an embodiment may be more likely to be able to obtain more relevant information to provide computer implemented services.

Figure 4A:
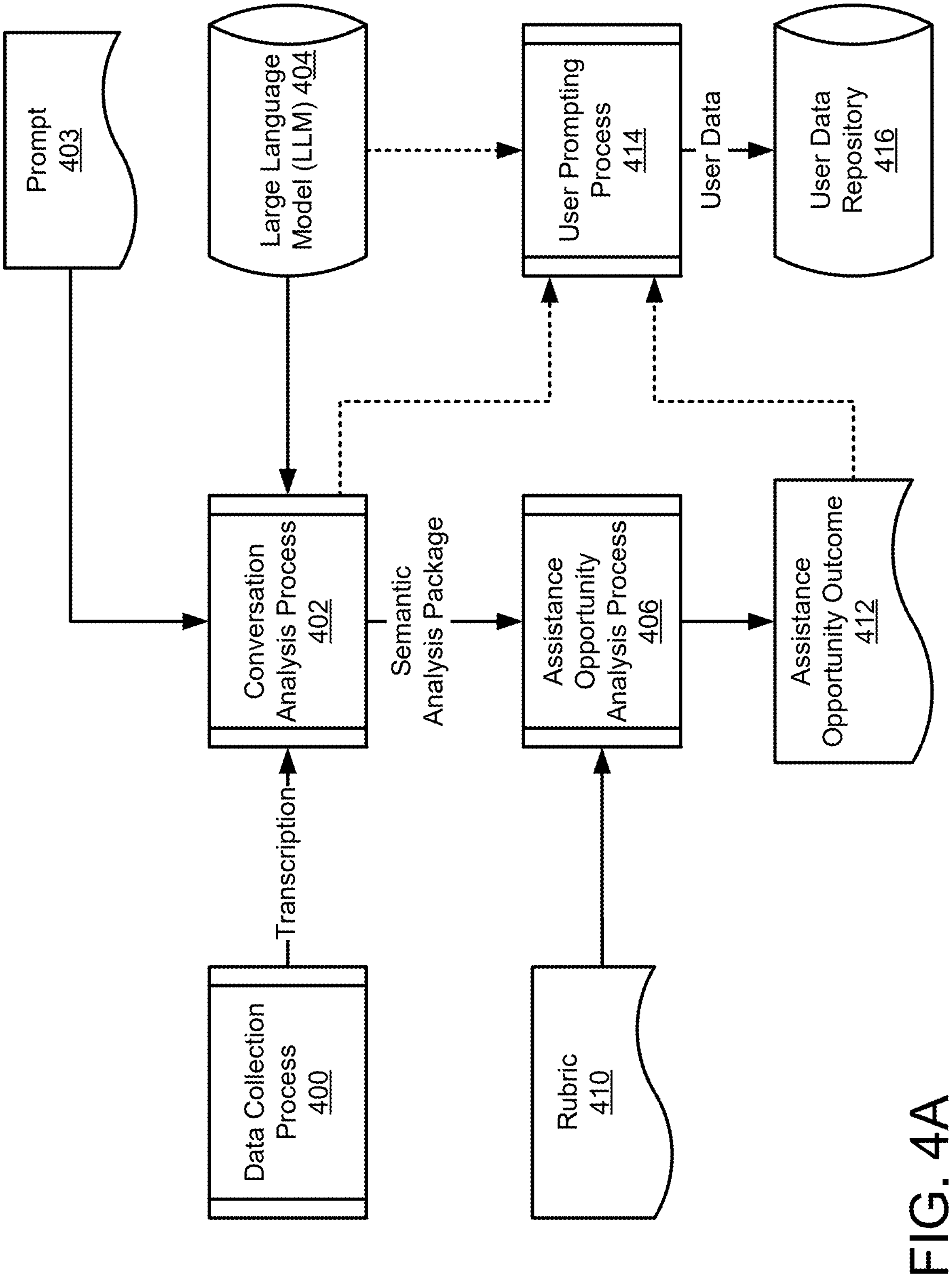
FIGS. 4A-4B show data flow diagrams in accordance with an embodiment.
Figure 4B:
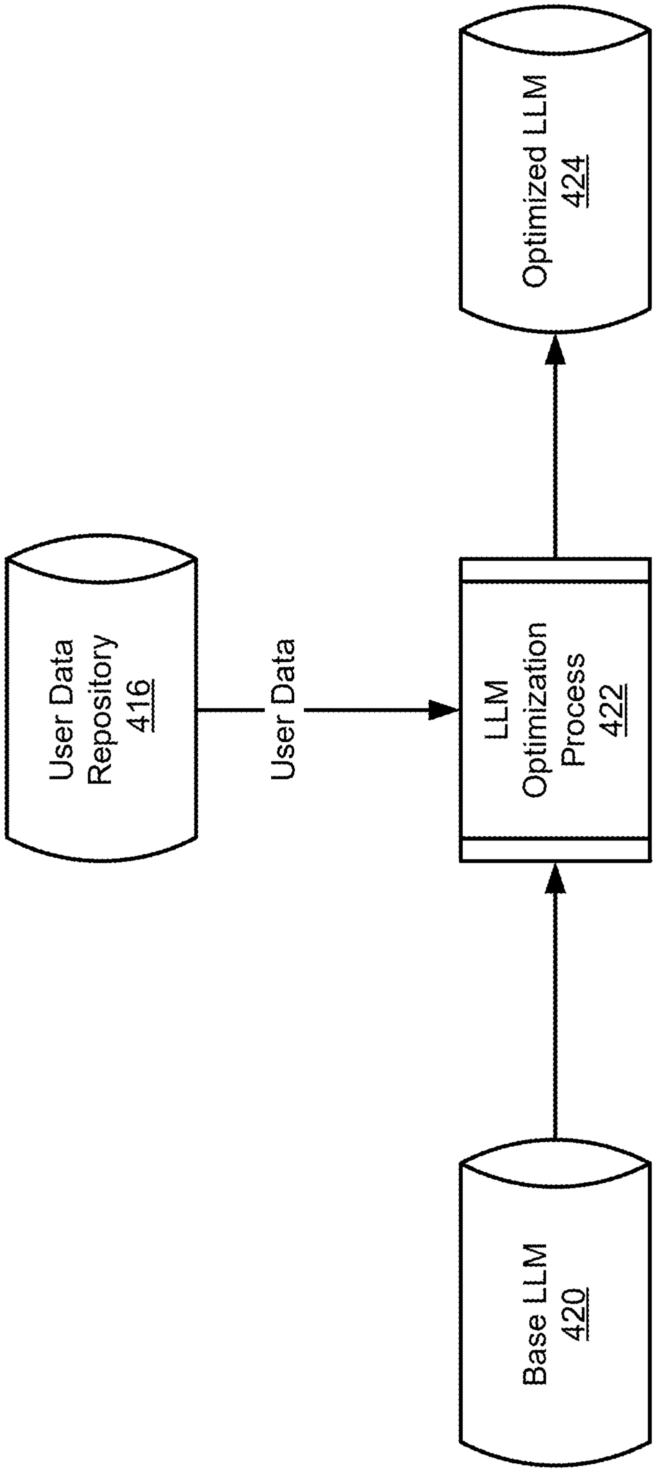

To further clarify embodiments disclosed herein, data flow diagrams in accordance with an embodiment are shown in FIGS. 4A-4B. In these diagrams, flows of data and processing of data are illustrated using different sets of shapes. A first set of shapes (e.g., 410, 412, etc.) is used to represent data structures, a second set of shapes (e.g., 400, 402, etc.) is used to represent processes performed using and/or that generate data, and a third set of shapes (e.g., 404, 416, etc.) is used to represent large scale data structures such as databases.

Turning to FIG. 4A, a first data flow diagram in accordance with an embodiment is shown. The first data flow diagram may illustrate data used in and data processing performed in providing information that may be more relevant to a conversation that the user of a display free body wearable computing device may be involved.

To provide the information that may be more relevant to the conversation, data collection process 400 may be performed. During data collection process 400, a conversation that the user is having may be identified, and a transcription of at least a portion of the conversation may be obtained. To identify the conversation that the user is having, audio data may be collected by at least one sensor (e.g., a microphone array) of display free body wearable computing device 50. The audio data may be processed to identify features (e.g., phonemes, frequencies, words, etc.) of speech, for example, by performing frequency isolation and/or word analysis, utilizing speech-to-text applications (e.g., automatic speech recognition), and/or performing any other actions. Additionally, identities of a plurality of speakers (e.g., the user and at least one other person) may be labeled based on the audio data. The transcription of at least the portion of the conversation may be obtained by converting the audio data to a text format and annotating the text format with the identified identities of the plurality of speakers as sources of the portion of the conversation. Once obtained, the transcription may be analyzed by display free body wearable computing device 50 and/or any other entities to identify uncertainty regarding topics discussed in the conversation.

To identify uncertainty regarding topics discussed in the conversation, conversation analysis process 402 may be performed. During conversation analysis process 402, large language model 404 may be prompted to analyze the transcription, and a semantic analysis package may be obtained. To prompt large language model 404, prompt 403 may be provided as an input to large language model 404. Prompt 403 may include any number and/or type of information regarding a request to analyze the transcription of the portion of the conversation. For example, prompt 403 may include a text file that describes a context of the request (e.g., for purposes of conversation assistance), a list of criteria to identify, an expected output format, and/or any other information.

Large language model 404 may include any number and/or type of information regarding a language based inference model. Large language model 404 may be hosted by data processing system 114 and/or any remote entities (e.g., service platforms 204). Large language model 404 may include, for example, parameters (e.g., weights, neural network layers, etc.) based on training data. The parameters may be provided by the remote entities and/or may include training based on historical samples of interactions between the user and display free body wearable computing device 50. Refer to FIG. 4B for additional details regarding optimization of the large language model.

To obtain the semantic analysis package, large language model 404 may process prompt 403 and the transcription obtained from data collection process 400 as inputs to any number and/or types of inference models. The semantic analysis package may be generated based on prompt 403 and the transcription, and may be provided to display free body wearable computing device 50. The semantic analysis package may include topics of the conversation, questions regarding the topics discussed during the conversation, levels of disagreement regarding potential answers to the questions, and/or any other information. The levels of disagreement may further include, for example, uncertainty levels and/or levels of debate in the questions present in the conversation. For example, a plurality of speakers may be discussing a cooking time for steak and each of the plurality of speakers may express conflicting answers to the cooking time. By providing the semantic analysis package, display free body wearable computing device 50 may identify whether assistance may be desirable (e.g., to provide an answer to the cooking time).

To determine whether it may be desirable for display free body wearable computing device 50 to intervene in the conversation, assistance opportunity analysis process 406 may be performed. During assistance opportunity analysis process 406, levels of disagreement may be graded using rubric 410, and a conclusion regarding whether it may be desirable to intervene in the conversation may be determined. Rubric 410 may include any number and/or type of information relevant to analyzing disagreement present in the conversation. For example, rubric 410 may include a list of metrics that may be identified based on the semantic analysis package. Rubric 410 may be adapted to identify, for example, a number of speakers in the conversation that may indicate uncertainty, a level of the uncertainty, a level of risk of use of incorrect information, a level of conflict involved between the speakers, and/or any other metrics.

To grade the levels of disagreement, questions corresponding to topics discussed in the conversation may be assigned grades based on rubric 410. The grades may subsequently be compared to a grades threshold to identify whether at least one of the grades exceeds the grades threshold. By comparing the grades to the grades threshold, assistance opportunity outcome 412 may be generated.

Assistance opportunity outcome 412 may include any number and/or type of information regarding whether it may be desirable for display free body wearable computing device 50 to intervene in the conversation. For example, assistance opportunity outcome 412 may include a Boolean (e.g., true/false) statement based on a conclusion of the comparison between the grades of the levels of disagreement to the grades threshold. For example, if at least one of the grades exceeds the grades threshold, assistance opportunity outcome 412 may include a true statement, and if none of the at least one of the grades exceeds the grades threshold, assistance opportunity output 412 may include false statement. Assistance opportunity outcome 412 may also include a question corresponding to the grade that exceeds the grades threshold. Using assistance opportunity outcome 412 and the semantic analysis package, the user may be notified of an availability of supplementary information.

For example, returning to the scenario in which the speakers are in disagreement regarding a cooking time for steak, assistance opportunity outcome 412 may indicate that it is desirable to intervene in the conversation due to a level of risk (e.g., food poisoning due to incorrect information), a level of conflict (e.g., if the speakers are discussing the topics for a longer period of time), and/or any other criteria.

If it is concluded to not be desirable for display free body wearable computing device 50 to intervene in the conversation (e.g., based on a false statement of assistance opportunity outcome 412), user prompting process 414 may not be performed (as indicated by short-dashed lines of data flow to user prompting process 414).

To attempt to provide the supplementary information to the user, user prompting process 414 may be performed. During user prompting process 414, the user may be discreetly notified of availability of the supplementary information, the user feedback may be monitored, the supplementary information may be generated, the supplementary information may be attempted to be provided to the user, and user data may be collected. To discreetly notify the user, a notification (e.g., a sound, vibration, etc.) may be provided to the user via at least one sensor of display free body wearable computing device 50. Based on the notifying, user feedback may be monitored. The user feedback may include, for example, contact (e.g., touching, pressing, etc.) of touchpad 108. If user feedback indicates agreement to the intervening (e.g., the user presses touchpad 108), the supplementary information may be generated and attempted to be provided to the user.

To generate the supplementary information, at least one of the questions (e.g., identified based on the semantic analysis package and/or assistance opportunity outcome 412) may be used to prompt large language model 404 to obtain an answer to the at least one of the questions. To attempt to provide the answer to the user, display free body wearable computing device 50 may initiate communication of the answer while monitoring for changes to the user feedback. For example, if the user releases contact with touchpad 108 while the answer is being communicated, the providing of the answer may be terminated.

User data may be collected at any point of user prompting process 414. User data may include, for example, a time taken to obtain user input when the notification is provided to the user, a percentage of the answer provided before termination, content of conversation following providing of the answer, and/or any other information. The user data may be stored in user data repository 416. User data repository 416 may be hosted by data processing system 114 and/or remote entities (e.g., service platforms 204) for use in improving computer-implemented services (e.g., a future instance of intervening in a conversation with supplementary information) provided by display free body wearable computing device 50. Refer to FIG. 4B for additional information regarding optimizing a large language model based on user data.

Thus, using the data flow shown in FIG. 4A, relevant information regarding a conversation may be obtained by display free body wearable computing device 50 and used to intervene in the conversation with relevant supplementary information.

Turning to FIG. 4B, a second data flow diagram in accordance with an embodiment is shown. The second data flow diagram may illustrate data used in and data processing performed in improving a likelihood that display free body wearable computing device 50 may intervene with information that be relevant and/or welcome by a user of display free body wearable computing device 50.

To improve the likelihood that display free body wearable computing device 50 may intervene with relevant information, large language model optimization process 422 may be performed. During large language model 422, base large language model 420 may be trained using user data from user data repository 416. Base large language model 420 may include any number and/or type of information regarding a language based inference model. Large language model 420 may be hosted by data processing system 114 and/or any remote entities (e.g., service platforms 204). Large language model 404 may include, for example, parameters (e.g., weights, neural network layers, etc.) based on training data and/or initialized (e.g., via an initialization algorithm, a neural network framework, etc.).

To train large language model 420, user data from user data repository 416 may be provided to base large language model 420 for ingestion, large language model 420 may be prompted to learn (e.g., recognize patterns) based on the user data, a training process may be performed, and/or any other processes may be performed. A result of large language model optimization process may include obtaining optimized large language model 424.

Optimized large language model 224 may, similar to base large language model 420, include any number and/or type of information regarding a language based inference model. Optimized large language model 224 may include parameters that may be modified (e.g., when compared to parameters of base large language model 420) based on training performed during large language model optimization process 422.

Thus, using the data flow shown in FIG. 4A, a large language model may be optimized based on previous instances of display free body wearable computing device 50 attempting to intervene with supplementary information in conversations. By doing so, a quality of computer-implemented services provided using an optimized large language model may be improved.

Figure 5:
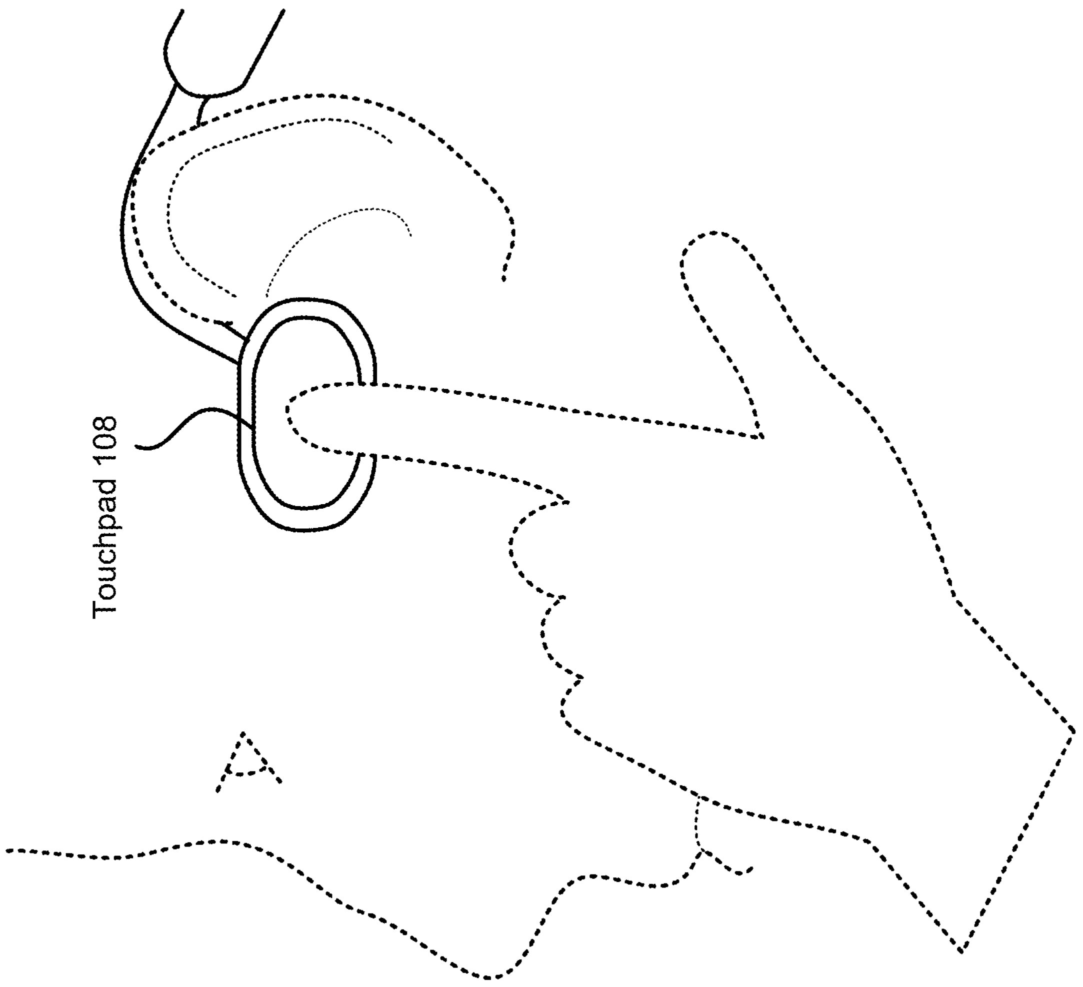
FIG. 5 shows an example diagram illustrating activity that may occur during performance of methods in accordance with an embodiment.

To further clarify details of the disclosed embodiments, FIG. 5 shows an example figure depicting activity that may occur while the methods shown in FIGS. 3A-3B are performed.

Turning to FIG. 5, a first example diagram showing activity that may occur while supplementary information is attempted to be provided to a user of display free body wearable computing device 50 in accordance with an embodiment is shown.

Prior to FIG. 5, display free body wearable computing device 50 may have determined that it may be desirable to intervene in a conversation that the user may be having with at least one other person based on data collected from the conversation and any number and or types of processes performed using the data (not shown). The conversation may include a question related to a topic that the user and the at least one other person are uncertain about with respect to potential answers to the question. For example, the user and the at least one other person may be uncertain about a target tire pressure to inflate a tire of a car used by the user.

In FIG. 5, display free body wearable computing device 50 may have discreetly provided a notification (e.g., a chime sound) to the user via speakers of integrated sensing and interaction component 100. The notification may indicate that an answer to question may be available. The user may agree to the intervening with the answer by pressing touchpad 108, as shown. The user may conversely not agree to the intervening by ignoring the notification (not shown).

If the user agrees to the intervening, display free body wearable computing device 50 may subsequently initiate providing of the answer by generating the answer based on information obtained relevant to the question (e.g., information relevant to the type of car, season, tires, etc.) and communicating the answer (e.g., the target tire pressure) via speakers of integrated sensing and interaction component 100.

While communicating the answer, the user may maintain contact with touchpad 108 (e.g., to hear the answer until the end) or release contact with touchpad 108 to indicate that the answer is unwelcome (e.g., due to the answer not being relevant the type of car used by the user, the answer including additional information beyond the target tire pressure provided at the beginning of the providing of the answer, etc.). When the user releases contact with touchpad 108 prior to completion of providing the answer, the providing of the answer may be terminated.

User data may be collected at any point prior to, during, and/or following actions illustrated in FIG. 5. For example, user data may be collected that indicates whether the user agrees to the intervening, a time taken to obtain user input when the notification is provided to the user, a percentage of the answer provided before termination, content of conversation following providing of the answer, and/or any other information. The user data may be used to improve a likelihood of display free body wearable computing device 50 intervening with information that may be relevant and/or welcome by the user in a future instance of intervening by display free body wearable computing device 50.

Figure 6:
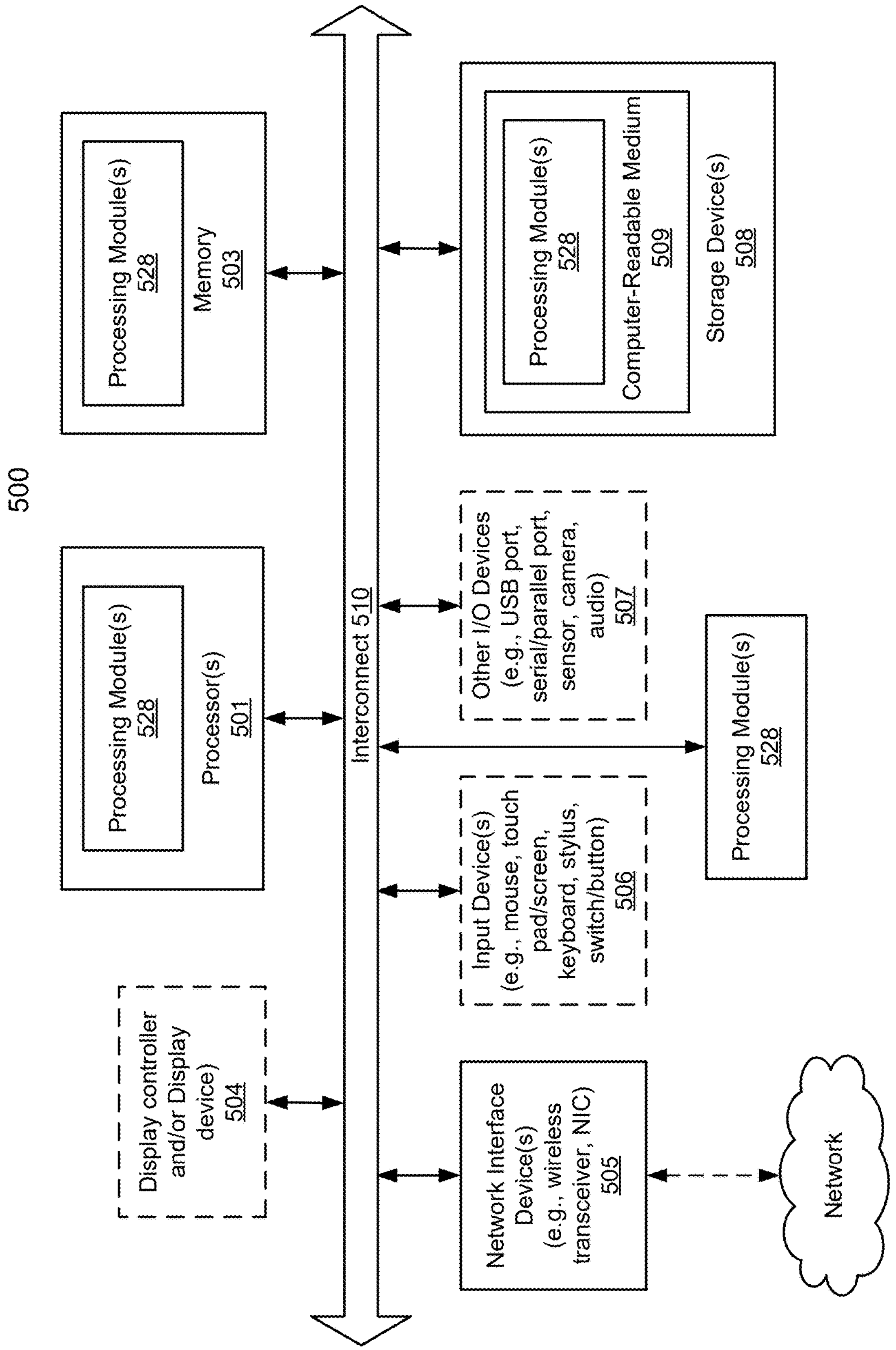
FIG. 6 shows a block diagram illustrating a data processing system in accordance with an embodiment.

Any of the components illustrated in FIGS. 1A-2 may be implemented with one or more computing devices. Turning to FIG. 6, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone array to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for obtaining information using a display free body wearable computing device, the method comprising:
- identifying that a user of the display free body wearable computing device is having a conversation;
- based on the identifying:
  - obtaining, using at least one sensor of the display free body wearable computing device, a transcription of at least a portion of the conversation;
  - obtaining, based on the transcription, a semantic analysis package for the conversation by prompting a large language model to identify, in the transcription, at least:
    - topics of the conversation;
    - questions regarding the topics discussed during the conversation; and
    - levels of disagreement regarding potential answers to the questions;
  - making, based at least on the semantic analysis package, a determination regarding whether it is desirable for the display free body wearable computing device to intervene in the conversation by:
    - grading, using a rubric, the levels of disagreement regarding potential answers to the questions corresponding to the topics and the questions to obtain grades for the topics and the questions;
    - identifying whether at least one of the grades exceeds a grades threshold;
    - in a first instance of the identifying where the at least one of the grades exceeds the grades threshold: concluding that it is desirable; and
    - in a second instance of the identifying where none of at least one of the grades exceeds the grades threshold: concluding that it is not desirable;
  - in a first instance of the determination where it is desirable:
    - generating, based at least on the semantic analysis package, supplementary information;
    - prompting the user to attempt to intervene in the conversation using the supplementary information; and
    - in a first instance of the prompting where the user agrees to allow the attempt to intervene: attempting to provide the user the supplementary information.

2. The method of claim 1, wherein identifying that the user of the display free body wearable computing device is having the conversation comprises:
- obtaining, using at least one audio sensor of the display free body wearable computing device, audio data; and
- identifying that the audio data comprises speech between a plurality of speakers, the plurality of speakers comprising the user of the display free body wearable computing device and at least one other person.

3. The method of claim 2, wherein obtaining the transcription comprises:
- transcribing an audio recording of the conversation into a text format; and
- annotating the text format with identities of the plurality of the speakers based on a speaker segmentation performed to identify the identities of the plurality of speakers as sources of a portion of the audio recording.

4. The method of claim 1, wherein the levels of disagreement regarding potential answers to the questions comprise:
- uncertainty levels in the questions present in the conversation; and
- levels of debate in the questions present in the conversation.

5. The method of claim 4, wherein generating, based at least on the semantic analysis package, the supplementary information comprises:
- prompting, using at least one of the questions, a generative model to obtain an answer.

6. The method of claim 5, wherein prompting the user to attempt to intervene in the conversation using the supplementary information comprises:
- discreetly notifying the user of availability of the answer and monitoring for user feedback based on the notifying;
- in a first instance of the notifying where the user provides user feedback indicating agreement to the intervening: concluding that the user desires the intervening; and
- in a second instance of the notifying where the user does not provide user feedback:
  - concluding that the user does not desire the intervening.

7. The method of claim 5, wherein attempting to provide the user the supplementary information comprises:
initiating discreetly providing of the answer to the user while monitoring for user input during the providing; and
in an instance of the initiating where the user provides the user input indicating that the answer is unwelcome: terminating the providing before completing of the providing of the answer to the user.

8. The method of claim 1, wherein the display free body wearable computing device comprises:
an integrated sensing and interaction component adapted to:
be positioned symmetrically on two portions of a user's head,
be positioned between ears and eyes of the user, and
capture a stereo image of at least a portion of a scene present in a field of view of the user;
an integrated computing, powering, and securing portion; and
an adjustment member adapted to position the integrated sensing and interaction component with respect to the integrated computing, powering, and securing portion.

9. The method of claim 8, wherein the integrated sensing and interaction component comprises:
a pair of cameras;
speakers;
a microphone array; and
a touch pad.

10. The method of claim 9, wherein the integrated sensing and interaction component is adapted to:
obtain an audio input from the integrated sensing and interaction component;
perform, by the integrated computing, powering, and securing portion, a speech recognition action set, based on the audio input, to obtain a speech recognition result;
obtain a portion of data from a remote entity, the data being based at least in part on the speech recognition result; and
use the portion of the data to assist in an interaction that the user is involved in.

11. A non-transitory machine-readable medium having instructions stored therein, which when executed by a processor, cause the processor to perform operations for obtaining information using a display free body wearable computing device, the operations comprising:
identifying that a user of the display free body wearable computing device is having a conversation;
based on the identifying:
obtaining, using at least one sensor of the display free body wearable computing device, a transcription of at least a portion of the conversation;
obtaining, based on the transcription, a semantic analysis package for the conversation by prompting a large language model to identify, in the transcription, at least:
topics of the conversation;
questions regarding the topics discussed during the conversation; and
levels of disagreement regarding potential answers to the questions;
making, based at least on the semantic analysis package, a determination regarding whether it is desirable for the display free body wearable computing device to intervene in the conversation by:
grading, using a rubric, the levels of disagreement regarding potential answers to the questions corresponding to the topics and the questions to obtain grades for the topics and the questions;
identifying whether at least one of the grades exceeds a grades threshold;
in a first instance of the identifying where the at least one of the grades exceeds the grades threshold: concluding that it is desirable; and
in a second instance of the identifying where none of at least one of the grades exceeds the grades threshold: concluding that it is not desirable;
in a first instance of the determination where it is desirable:
generating, based at least on the semantic analysis package, supplementary information;
prompting the user to attempt to intervene in the conversation using the supplementary information; and
in a first instance of the prompting where the user agrees to allow the attempt to intervene:
attempting to provide the user the supplementary information.

12. The non-transitory machine-readable medium of claim 11, wherein identifying that the user of the display free body wearable computing device is having the conversation comprises:
obtaining, using at least one audio sensor of the display free body wearable computing device, audio data; and
identifying that the audio data comprises speech between a plurality of speakers, the plurality of speakers comprising the user of the display free body wearable computing device and at least one other person.

13. The non-transitory machine-readable medium of claim 12, obtaining the transcription comprises:
transcribing an audio recording of the conversation into a text format; and
annotating the text format with identities of the plurality of the speakers based on a speaker segmentation performed to identify the identities of the plurality of speakers as sources of a portion of the audio recording.

14. A data processing system, comprising:
a processor;
and a memory coupled to the processor to store instructions, which when executed by the processor, cause the processor to perform operations obtaining information using a display free body wearable computing device, the operations comprising:
identifying that a user of the display free body wearable computing device is having a conversation;
based on the identifying:
obtaining, using at least one sensor of the display free body wearable computing device, a transcription of at least a portion of the conversation;
obtaining, based on the transcription, a semantic analysis package for the conversation by prompting a large language model to identify, in the transcription, at least:
topics of the conversation;
questions regarding the topics discussed during the conversation; and
levels of disagreement regarding potential answers to the questions;
making, based at least on the semantic analysis package, a determination regarding whether it is desirable for the display free body wearable computing device to intervene in the conversation by:

grading, using a rubric, the levels of disagreement regarding potential answers to the questions corresponding to the topics and the questions to obtain grades for the topics and the questions;

identifying whether at least one of the grades exceeds a grades threshold;

in a first instance of the identifying where the at least one of the grades exceeds the grades threshold: concluding that it is desirable; and in a second instance of the identifying where none of at least one of the grades exceeds the grades threshold:

concluding that it is not desirable;

in a first instance of the determination where it is desirable:

generating, based at least on the semantic analysis package, supplementary information;

prompting the user to attempt to intervene in the conversation using the supplementary information; and in a first instance of the prompting where the user agrees to allow the attempt to intervene:

attempting to provide the user the supplementary information.

15. The data processing system of claim 14, wherein identifying that the user of the display free body wearable computing device is having the conversation comprises:

obtaining, using at least one audio sensor of the display free body wearable computing device, audio data; and identifying that the audio data comprises speech between a plurality of speakers, the plurality of speakers comprising the user of the display free body wearable computing device and at least one other person.

16. The data processing system of claim 15, wherein obtaining the transcription comprises:

transcribing an audio recording of the conversation into a text format; and annotating the text format with identities of the plurality of the speakers based on a speaker segmentation performed to identify the identities of the plurality of speakers as sources of a portion of the audio recording.

17. The data processing system of claim 14, wherein the levels of disagreement regarding potential answers to the questions comprises:

uncertainty levels in the questions present in the conversation; and levels of debate in the questions present in the conversation.

18. The data processing system of claim 17, wherein generating, based at least on the semantic analysis package, the supplementary information comprises:

prompting, using at least one of the questions, a generative model to obtain an answer.

19. The data processing system of claim 18, wherein prompting the user to attempt to intervene in the conversation using the supplementary information comprises:

discreetly notifying the user of availability of the answer and monitoring for user feedback based on the notifying;

in a first instance of the notifying where the user provides user feedback indicating agreement to the intervening:

concluding that the user desires the intervening; and in a second instance of the notifying where the user does not provide user feedback:

concluding that the user does not desire the intervening.

20. The data processing system of claim 18, wherein attempting to provide the user the supplementary information comprises:

initiating discreetly providing of the answer to the user while monitoring for user input during the providing; and in an instance of the initiating where the user provides the user input indicating that the answer is unwelcome:

terminating the providing before completing of the providing of the answer to the user.

* * * * *